(12) United States Patent
Boll et al.

(10) Patent No.: US 8,826,581 B2
(45) Date of Patent: Sep. 9, 2014

(54) STABILIZING SHOOTING REST APPARATUS AND METHOD

(71) Applicants: Edward E. Boll, Niverville, NY (US); Edward J. Boll, Niverville, NY (US)

(72) Inventors: Edward E. Boll, Niverville, NY (US); Edward J. Boll, Niverville, NY (US)

(*) Notice: Subject to any disclaimer, the term of this patent is extended or adjusted under 35 U.S.C. 154(b) by 0 days.

(21) Appl. No.: 13/974,225

(22) Filed: Aug. 23, 2013

(65) Prior Publication Data

US 2014/0082987 A1 Mar. 27, 2014

Related U.S. Application Data

(60) Provisional application No. 61/706,445, filed on Sep. 27, 2012.

(51) Int. Cl.
| | |
|---|---|
| *F41A 23/00* | (2006.01) |
| *A01M 31/02* | (2006.01) |
| *F41A 99/00* | (2006.01) |
| *F41A 23/06* | (2006.01) |
| *F41A 23/04* | (2006.01) |
| *F41C 33/00* | (2006.01) |

(52) U.S. Cl.
CPC .............. *F41A 99/00* (2013.01); *A01M 31/02* (2013.01); *F41A 23/06* (2013.01); *F41A 23/04* (2013.01); *F41C 33/001* (2013.01)
USPC ............................................................ 42/94

(58) Field of Classification Search
CPC ........ F41C 33/00; F41C 33/001; F41C 23/00; F41C 23/04; F41C 23/06; F41C 23/18
USPC ................. 42/94; 211/64; 224/243, 904, 913; 248/118, 118.1, 118.3, 288.31, 354.6
See application file for complete search history.

(56) References Cited

U.S. PATENT DOCUMENTS

| | | | | |
|---|---|---|---|---|
| 46,365 A * | 2/1865 | Kinman | ............................. | 42/94 |
| 74,119 A * | 2/1868 | Muller | ............................. | 42/36 |
| 167,169 A * | 8/1875 | Hare | .................................. | 42/94 |
| 281,338 A * | 7/1883 | Butler | ............................. | 42/94 |
| 454,300 A * | 6/1891 | Sproul | ............................. | 42/94 |
| 599,096 A * | 2/1898 | Eckman | ............................ | 42/94 |
| 664,979 A * | 1/1901 | Taylor | .............................. | 42/94 |
| 759,593 A * | 5/1904 | Cover | ............................... | 42/94 |
| 784,390 A * | 3/1905 | Dunham | ........................ | 42/94 |
| 798,734 A * | 9/1905 | King | ................................. | 42/94 |
| 915,481 A * | 3/1909 | Roop | ............................... | 42/94 |
| 1,156,370 A * | 10/1915 | Pomeroy | ...................... | 224/547 |
| 1,406,827 A * | 2/1922 | Dumas | ............................. | 42/94 |
| 1,469,285 A * | 10/1923 | Thompson | .................... | 224/270 |
| 1,688,148 A * | 10/1928 | Martin | .................... | 248/229.12 |
| 1,890,423 A * | 12/1932 | Teagarden | ........................ | 42/94 |
| 2,403,654 A * | 7/1946 | Gerdes | .......................... | 248/118 |

(Continued)

*Primary Examiner* — Jonathan C Weber
(74) *Attorney, Agent, or Firm* — Schmeiser, Olsen & Watts, LLP

(57) ABSTRACT

Disclosed herein is a stabilizing shooting rest that includes a base attachable to the belt of a wearer. The stabilizing shooting rest further includes a telescopic elongated member having a proximate end attached to the base and extending to a distal end, the telescopic elongated member attaching to the base such that the telescopic elongated member is movable about the base with at least two rotational degrees of freedom. The stabilizing shooting rest further includes an arm rest at the distal end of the telescopic elongated member, the arm rest configured to stabilize a desired portion of a rear arm of the wearer while the wearer is shooting.

18 Claims, 21 Drawing Sheets

(56) References Cited

U.S. PATENT DOCUMENTS

| | | | | |
|---|---|---|---|---|
| 3,022,898 A * | 2/1962 | Loeb | | 211/64 |
| 3,191,826 A * | 6/1965 | Adams | | 224/185 |
| 3,200,528 A * | 8/1965 | Christensen | | 42/94 |
| 3,225,656 A * | 12/1965 | Flaherty et al. | | 89/37.04 |
| 3,390,477 A * | 7/1968 | Galbraith | | 42/94 |
| 3,963,156 A * | 6/1976 | Perrin | | 224/268 |
| 4,844,390 A * | 7/1989 | Duke | | 248/118 |
| 4,896,806 A * | 1/1990 | Sanchez, Jr. | | 224/242 |
| 4,913,391 A * | 4/1990 | Klipp | | 248/214 |
| 5,351,867 A * | 10/1994 | Vest | | 224/661 |
| 5,528,846 A * | 6/1996 | Baggett | | 42/94 |
| 5,697,537 A * | 12/1997 | Bowlsby | | 224/270 |
| 5,735,496 A * | 4/1998 | Dube | | 248/118 |
| 5,738,256 A * | 4/1998 | Goff et al. | | 224/185 |
| D395,070 S * | 6/1998 | McGowan | | D22/108 |
| 5,778,589 A * | 7/1998 | Teague | | 42/94 |
| 5,784,820 A * | 7/1998 | Wood | | 42/94 |
| 5,988,466 A * | 11/1999 | Brown | | 224/185 |
| 6,009,655 A * | 1/2000 | Austin | | 42/94 |
| 6,082,034 A * | 7/2000 | Musmanno | | 42/94 |
| 6,089,426 A * | 7/2000 | Brandow et al. | | 224/268 |
| 6,267,335 B1 * | 7/2001 | Barrett | | 248/118 |
| 6,276,087 B1 * | 8/2001 | Singletary | | 42/94 |
| 6,637,708 B1 * | 10/2003 | Peterson | | 248/285.1 |
| 6,793,108 B2 * | 9/2004 | Williams, Jr. | | 224/401 |
| 6,802,483 B1 * | 10/2004 | Leasure | | 248/229.15 |
| 6,829,856 B1 * | 12/2004 | Moorman | | 42/94 |
| 6,920,713 B1 * | 7/2005 | Love | | 42/94 |
| 7,065,914 B1 * | 6/2006 | Wagner, II | | 42/73 |
| 7,244,070 B2 * | 7/2007 | Burnett et al. | | 396/420 |
| 8,025,193 B1 * | 9/2011 | Gornall, Jr. | | 224/268 |
| D697,573 S * | 1/2014 | Smith et al. | | D22/107 |
| 2003/0038150 A1 * | 2/2003 | Williams | | 224/401 |
| 2003/0205653 A1 * | 11/2003 | Peterson | | 248/286.1 |
| 2005/0262753 A1 * | 12/2005 | Lahti | | 42/94 |

* cited by examiner

STABILIZING SHOOTING REST APPARATUS AND METHOD

CROSS REFERENCE TO RELATED APPLICATIONS

This application claims the benefit of U.S. Provisional Application No. 61/706,445, filed Sep. 27, 2012, entitled STABILIZING SHOOTING REST APPARATUS AND METHOD.

FIELD OF TECHNOLOGY

The subject matter disclosed herein relates generally to shooting stability. More particularly, the subject matter relates to a stabilizing shooting rest apparatus and method, for aiding a shooter that is aiming at a particular target, and discharging a firearm or crossbow with the intent of its projectile making contact with and accurately hitting that particular target.

BACKGROUND

Stationing and stabilizing a firearm or crossbow at the time of aiming and discharging is critical to the projectile hitting its intended target, and/or maintaining a tight group about the bull's eye. When a shooter is aiming a firearm or crossbow, they typically concentrate on centering and holding the firearm or crossbow sights on the target. The slightest wavering of the firearm or crossbow while it is being aimed and fired will have an adverse effect on the performance and outcome of the shot. Perfectly aligning the firearm or crossbow sight and maintaining this position is crucial to achieving the desired accuracy. The consequence of any movement during the aiming and firing procedure will result in a deficiency in the projectile's accuracy.

There have been several inventions designed to address and achieve better projectile accuracy. In every case of prior art, the attempts to resolve or at least minimize firearm or crossbow movement at the time of aiming and firing addresses the stabilizing or steadying of the front portion, that being the fore end, or barrel end of the firearm or crossbow stock. However, each prior art attempts to minimize the wavering and movement of a firearm or crossbow by either focusing exclusively on supporting and stabilizing the shooters arm which controls the front portion of the firearm or crossbow, or by allowing a stabilizing apparatus to actually make contact with the front portion, fore end, barrel, or any other forward physical part of the firearm or crossbow while attempting to support and minimize the firearm or crossbow's instability, wavering and movement.

Thus, a stabilizing shooting rest and method of use thereof that focuses on maintaining stability of the rear end of the firearm or crossbow stock by supporting the arm which steadies and controls the butt end of the firearm or crossbow stock, and by stationing the arm which is steadying the hand which features the shooter's trigger finger, would be well received in the art.

SUMMARY

According to a first described aspect, a stabilizing shooting rest comprises: a base attachable to the belt of a wearer; a telescopic elongated member having a proximate end attached to the base and extending to a distal end, the telescopic elongated member attaching to the base such that the telescopic elongated member is movable about the base with at least two rotational degrees of freedom; and an arm rest at the distal end of the telescopic elongated member, the arm rest configured to stabilize a desired portion of a rear arm of the wearer while the wearer is shooting.

According to a second described aspect, a method of stabilizing a firearm or crossbow comprises: providing a stabilizing shooting rest that includes: base portion attachable to the belt of a wearer; telescopic elongated member having a proximate end attached to the base portion and extending to a distal end, the telescopic elongated member attaching to the base portion such that the telescopic elongated member is movable about the base portion with at least two rotational degrees of freedom; and an arm rest portion at the distal end of the telescopic elongated member, the arm rest portion configured to stabilize desired portion of a rear arm of the wearer while the wearer is shooting; resting a rear arm or elbow on the arm rest portion of the stabilizing shooting rest; and holding a rear end of a firearm or crossbow with the rear arm.

According to a third described aspect, a stabilizing shooting rest comprises: a base attachable to the belt of a wearer, wherein the base includes a top member, wherein the base and the top member each extend from a first end to a second end, wherein a first portion of the base extends from each of the first end and the second end away from the top member, the first portion extending to a middle point located between the first and second end, wherein the middle point is a distal point of the base relative to the top member, wherein the base includes a second portion extending from the top member, the second portion extending within the bounds of the first portion and the top member, the second portion separately moveable about the top member relative to the first portion; a telescopic elongated member having a proximate end attached to the base and extending to a distal end; and an arm rest at the distal end of the telescopic elongated member, the arm rest configured to stabilize a desired portion of an arm of the wearer while the wearer is shooting.

According to a fourth described aspect, a stabilizing shooting rest comprises: a base including a clamp, the clamp having an upper and a lower member; a telescopic elongated member having a proximate end attached to the base and extending to a distal end, the telescopic elongated member attaching to the base such that the telescopic elongated member is movable about the base with at least two rotational degrees of freedom; and an arm rest at the distal end of the telescopic elongated member, the arm rest configured to stabilize a desired portion of a rear arm of the wearer while the wearer is shooting.

According to a fifth described aspect, a method of stabilizing a firearm or crossbow comprises: providing a stabilizing shooting rest that includes: base portion including a clamp, the clamp having an upper and a lower member; telescopic elongated member having a proximate end attached to the base portion and extending to a distal end, the telescopic elongated member attaching to the base portion such that the telescopic elongated member is movable about the base portion with at least two rotational degrees of freedom; and an arm rest portion at the distal end of the telescopic elongated member, the arm rest portion configured to stabilize desired portion of a rear arm of the wearer while the wearer is shooting; attaching the stabilizing shooting rest to an object; resting a rear arm or elbow on the arm rest portion of the stabilizing shooting rest; and holding a rear end of a firearm or crossbow with the rear arm.

According to a sixth described aspect, a stabilizing shooting rest comprises: a base including a clamp, the clamp having an upper and a lower member; a bow holder element attachable to the base, the bow holder element including a connecting plate, a first finger and a second finger, wherein the first and second fingers spaced apart such that a limb of a bow is insertable therein, wherein the connecting plate is configured to integrate with a flat surface of the base, the connecting plate rotatably attachable about the base in a plurality of positions, wherein a first surface of the connecting plate includes a protrusion, and wherein the flat surface of the base includes a plurality of first openings arranged in an arc, the protrusion configured to be inserted into each of the plurality of first openings to retain the bow holder element in each of the plurality of positions; a telescopic elongated member having a proximate end attached to the base and extending to a distal end; and an arm rest at the distal end of the telescopic elongated member, the arm rest configured to stabilize a desired portion of an arm of the wearer while the wearer is shooting.

BRIEF DESCRIPTION OF THE DRAWINGS

The subject matter disclosed herein is distinctly claimed in the claims at the conclusion of the specification. The foregoing and other features and advantages are apparent from the following detailed description taken in conjunction with the accompanying drawings in which:

DETAILED DESCRIPTION

A detailed description of the hereinafter described embodiments of the disclosed apparatus and method are presented herein by way of exemplification and not limitation with reference to the Figures.

Figure 1:
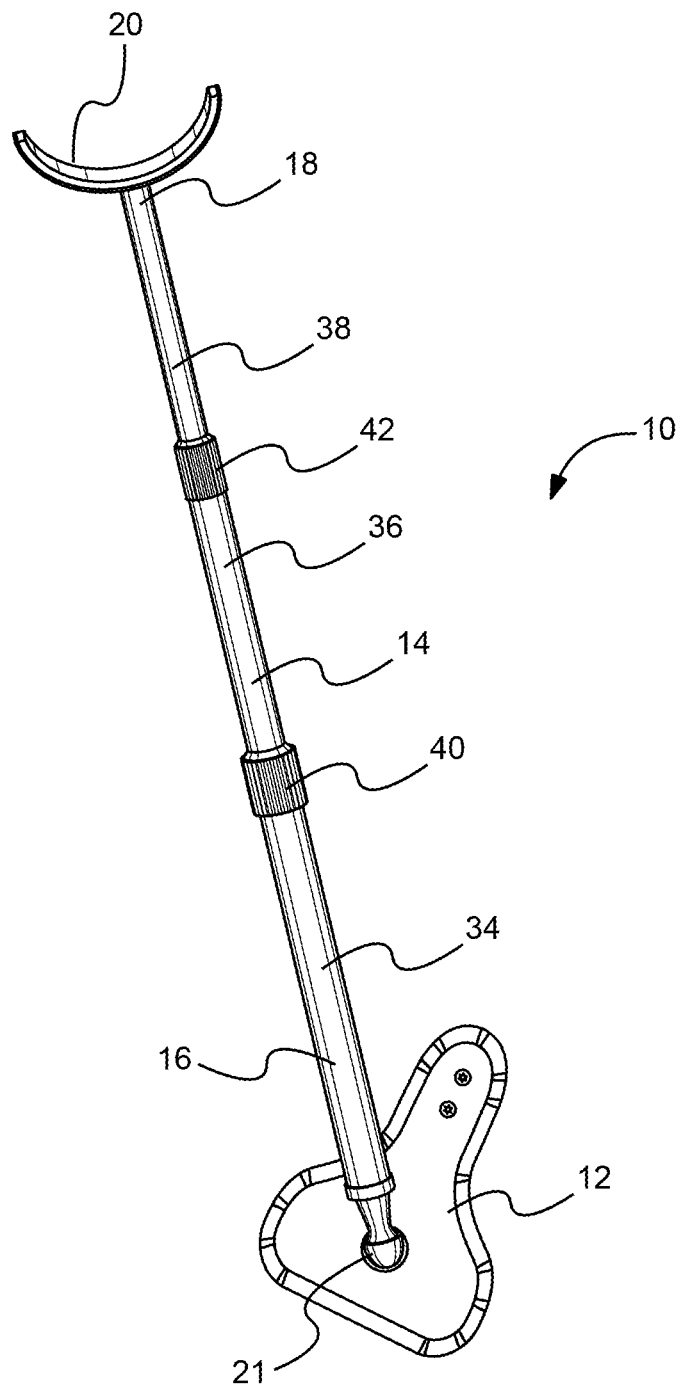
FIG. 1 depicts a perspective view of a stabilizing shooting apparatus extended according to one embodiment.
Figure 2:
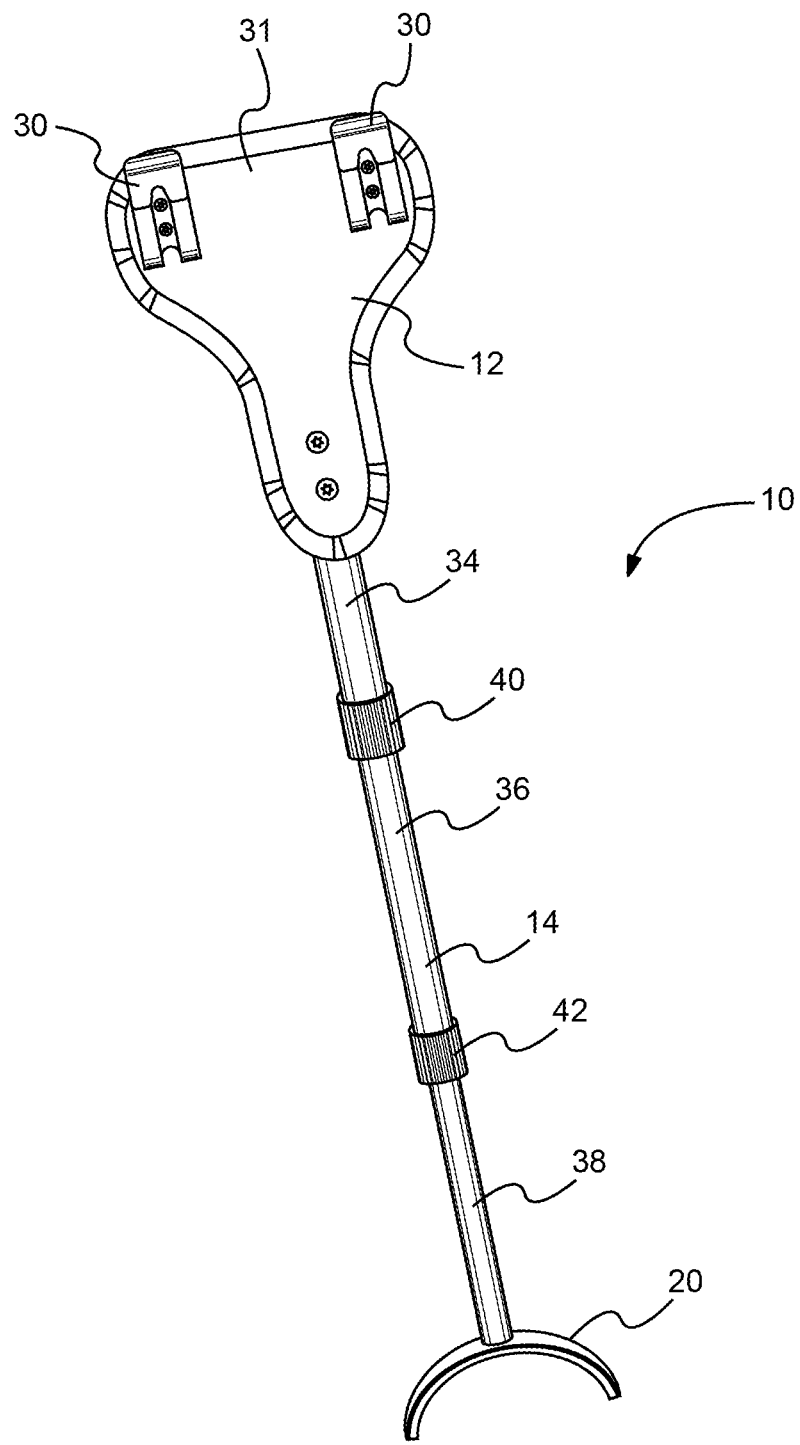
FIG. 2 depicts a perspective rear view of the extended stabilizing shooting apparatus of FIG. 1 according to one embodiment.
Figure 3:
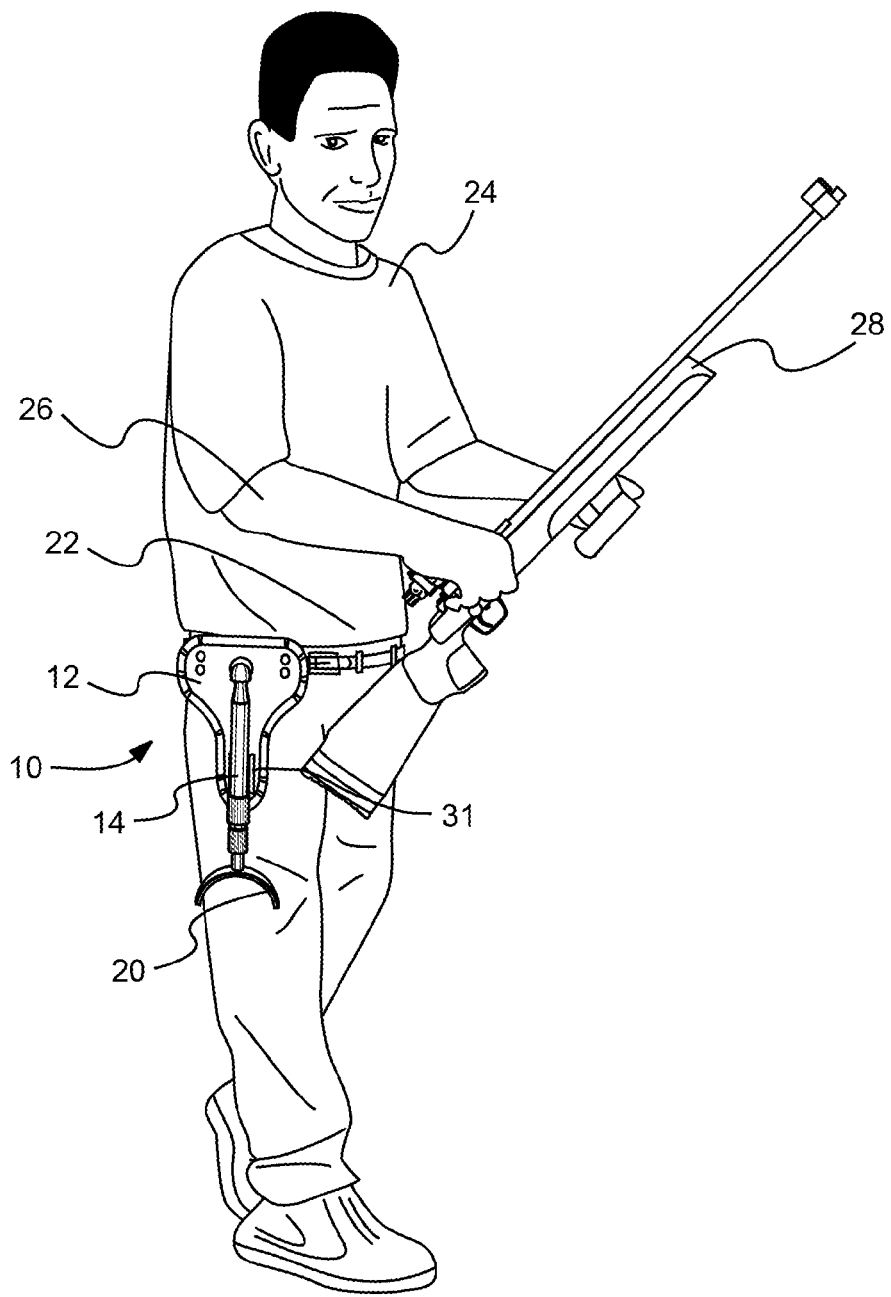
FIG. 3 depicts a perspective view of the stabilizing shooting apparatus of FIGS. 1-2, retracted being worn on a belt of a wearer while not in use according to one embodiment.
Figure 4:
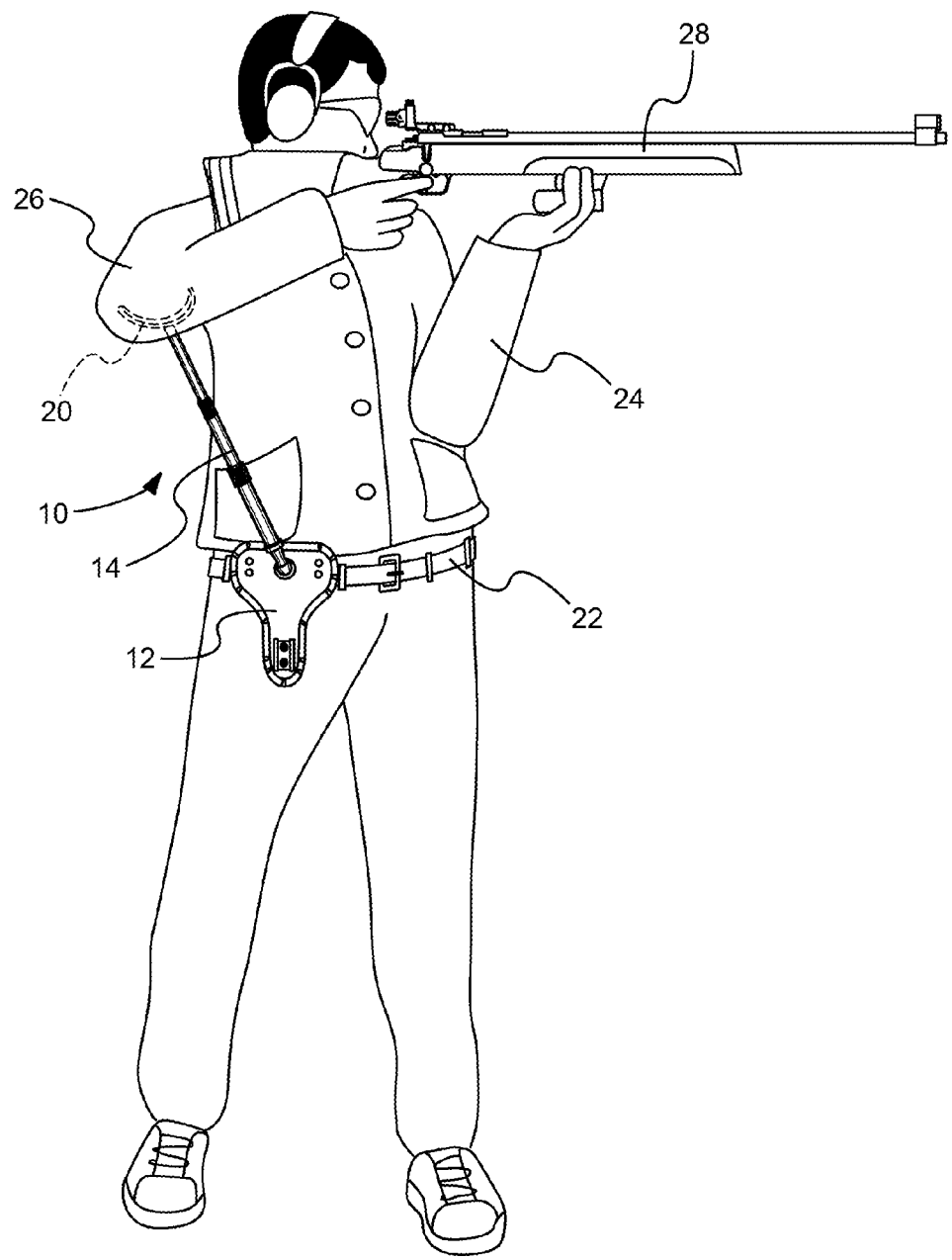
FIG. 4 depicts a perspective view of the stabilizing shooting apparatus of FIGS. 1-3 on the belt of the wearer in use according to one embodiment.

FIG. 1-2 show perspective views of a stabilizing shooting apparatus 10 according to one embodiment. In particular, FIG. 1 shows the stabilizing shooting apparatus 10 from the front, while FIG. 2 shows the stabilizing shooting apparatus from behind. The stabilizing shooting apparatus 10 includes a base portion 12 attachable to a belt 22 of a wearer/shooter 24, as shown in FIGS. 3-4. The stabilizing shooting apparatus 10 further includes a telescopic elongated member 14 attached to the base portion 12 at a joint 21 having a proximate end 16 attached to the base portion 12. The telescopic elongated member 14 further extends to a distal end 18. The stabilizing shooting rest 10 still further includes an arm rest portion 20 attached at the distal end 18 of the telescopic elongated member 14. The stabilizing shooting apparatus 10 may be configured to be worn on the belt 22 of the wearer/shooter 24, and employed to stabilize a rear arm or elbow 26, at various and/or a desired pointing the rear arm, relative to and depending on the angle of and presentation of the shot opportunity while the wearer/shooter 24 is shouldering, aiming and discharging a firearm or crossbow 28, from either sitting, standing, or kneeling position. It should be understood that the stabilizing shooting apparatus 10 may be configured for use with either a left handed or right handed shooter.

The telescopic elongated member 14 may be attached to the base portion 12 such that it is movable about the base portion 12. In the embodiment shown, the telescopic elongated member 14 is movable about the base portion 12 with two rotational degrees of freedom. FIG. 1 shows the elongated member 14 rotated about the base portion 12 with respect to FIG. 2. The elongated member 14 may also rotate such that the arm rest portion 20 rotates out of the page in FIG. 1 at least to some degree. In the embodiment shown, the joint 21 may be a ball and socket type joint that prevents full rotation of the arm rest portion 20 out of the page. For example, the arm rest portion 20 may be prevented from extending more than 45 degrees out of the page by the joint 21. However, the joint 21 may provide enough freedom to allow the arm rest portion 20 to reach the customizable location on the back elbow or arm of shooters 24 of different heights and sizes. In other words, these two rotational degrees of freedom of the telescopic elongated member 14 about the base portion 12 may allow the stabilizing shooting apparatus 10 to reach the appropriate location of the arm or elbow 26 of the wearer/shooter 24 when extending from the location at the waist of the wearer/shooter 24.

The telescopic elongated member 14 may also be telescopic such that it can be increased or decreased in length. In the embodiment shown in the FIGS. 1-5, the telescopic elongated member 14 may have a first segment 34, a second segment 36, and a third segment 38. The segments 34, 36, 38 may be separated by rotatable rings 40, 42. The rotatable rings 40, 42 may be compression rings that may be twisted or rotated in order to lock the segments 34, 36, 38 into place in relation to each other. Thus, the compression ring may be turned in a loosening direction in order to release the segments 34, 36, 38 with respect to each other so that the telescopic elongated member 14 may be expanded or contracted. The distal third segment 38 may have a smaller circumference than the middle second segment 36, which in turn may have a smaller diameter than the proximate first segment 34 allowing the elongated telescopic member 14 to expand and contract. The elongated telescopic member 14 may also include markings in order to ensure that the wearer 24 always opens the elongated telescopic member 14 to the same length in use.

Figure 5:
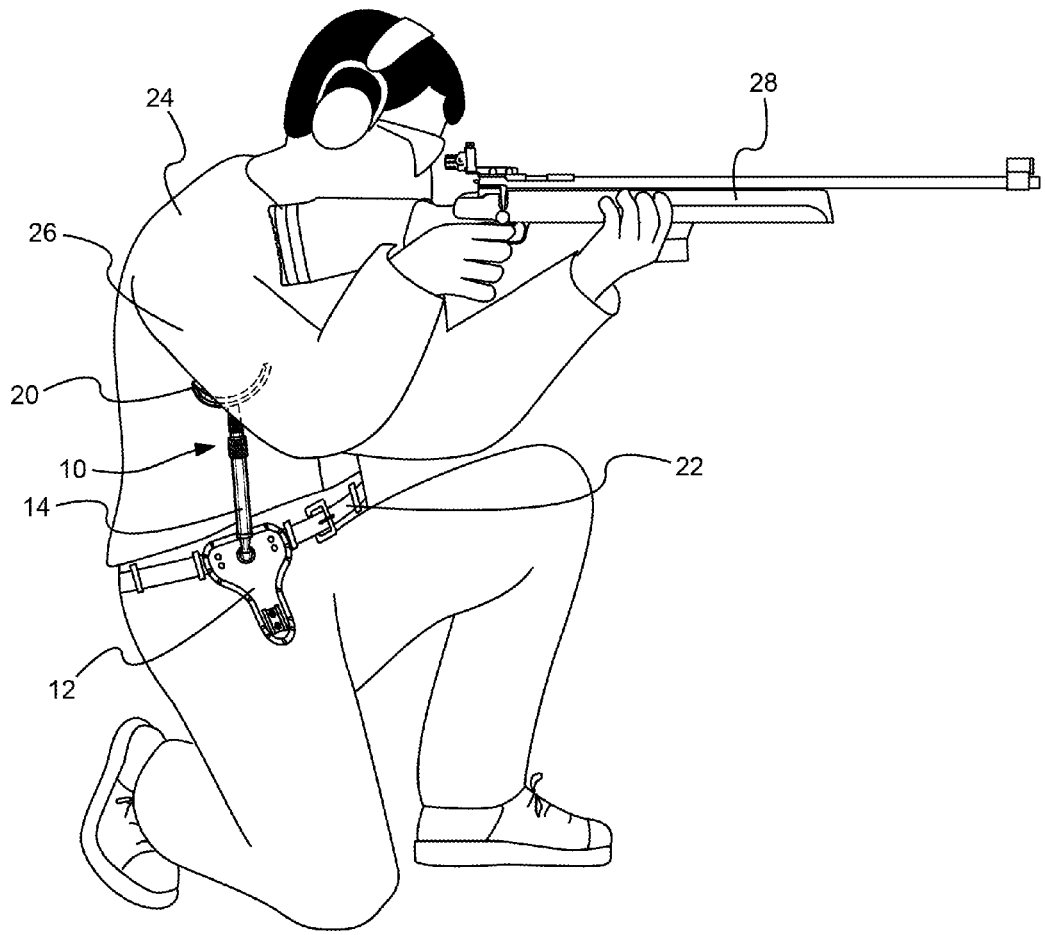
FIG. 5 depicts a perspective view of the stabilizing shooting apparatus of FIGS. 1-4 refracted in use while kneeling according to one embodiment.

The base portion 12 is shown to include two compression clips 30 on the back side 31 in the embodiment shown. The compression clips 30 may allow the stabilizing shooting apparatus 10 to be attached to the belt 22 or waistband of the wearer 24, as shown in FIGS. 3-5. However, other embodiments are contemplated in addition to the compression clip 30. Any base portion that includes a mechanism to attach to the belt of a wearer may be utilized. Other embodiments may include a loop and button, hook and loop fasteners, a clamp, clasp, or other fastening means. The base portion 12 may be made of a plastic, wood, metallic or synthetic material.

The base portion 12 may further include a protective flap 32. The protective flap (not shown) that may be employed when the stabilizing shooting apparatus 10 is in a collapsed state while not in use to protect the stabilizing shooting apparatus 10. The protective flap may be made from a cloth, plastic, metal, leather, or synthetic material. The protective flap may also help retain the telescopic elongated member 14 in a refracted state prior to use in the case that the wearer 24 does not tighten the rings 40, 42 after contracting the telescopic elongated member 14. The protective flap 32 may be connected to the base portion 12 with hook and loop fastener, a button, buckle or any other appropriate fastening means.

Located at the distal end of the telescopic elongated member 14 is the arm rest portion 20 of the stabilizing shooting apparatus 10. The arm rest portion 20 may be rotatable about the distal third segment 38 to allow freedom of positioning of the wearer 24 while shooting. In another embodiment (shown in FIGS. 9-13), the entire elongated member 14 may rotate rather than the arm rest portion 20. A locking portion may actually lock the arm rest portion 20 into place about the distal third segment 38 in order to prevent rotation once the proper position has been achieved. The arm rest portion 20 may have a constant curvature to ergonomically fit with the arm or elbow 26 of the wearer 24. In other embodiments, the arm rest portion 20 may simply be flat, or alternately the arm rest portion 20 may have a non-constant curvature across its length. The arm rest portion 20 may be wider or narrower than the embodiment depicted. The arm rest portion 20 may allow the arm or elbow 26 of the wearer 24 to comfortably rest on the arm rest portion 20 for an extended length of time while shooting. Like the base portion, the arm rest portion may be made of a plastic, wood, metallic or synthetic material.

FIG. 3 shows the stabilizing shooting apparatus 10 in a collapsed state when not in use. In particular, FIG. 3 shows the stabilizing shooting apparatus being worn on the belt 22 of the wearer. When not in use, the stabilizing shooting apparatus 10 may remain stationed at waist level while the wearer 24 moves about, or while the wearer 24 remains in a sitting position. When in a collapsed state, the telescopic elongated member 14 may be retracted within the base portion 12. The telescopic elongated member 14 may be pointed downwardly, hanging, for example, nine inches below the waist of the wearer 24 while being secured by a compression clip 31 of the base portion 12. This distance may be increased or decreased depending on the embodiment. Thus, in the presently shown embodiment, each of the first segment 34, second segment 36, and third segment 38 may have lengths less than nine inches to allow the compacted state of the stabilizing shooting apparatus 10 to have a length less than nine inches.

When a shooter requires its assistance, the stabilizing shooting apparatus 10 may be silently and immediately employed by the wearer 24. Employing the stabilizing shooting apparatus 10 may be achieved quickly and with very little detectable movement. To engage the stabilizing shooting apparatus 10, the wearer 24 may first detach the protective flap 32 from the base portion 12. The protective flap 32 may then unfold and hang downward from the base portion 12 in a non interfering position. The wearer 24 may then rotate the segments 34, 36, 38 of the telescopic elongated member 14 to an upwards pointing position in the first rotational degree of freedom.

The wearer may then expand the telescopic elongated member 14 by turning the rotatable rings 40, 42 counter clockwise to loosen the segments 34, 36, 38 to allow for expansion. The wearer 24 can then turn the rings clockwise to tighten the telescopic elongated member 14 and ensure that the segments 34, 36, 38 are in a locked position relative to each other. The wearer 24 can additionally pivot the telescopic elongated member 14 on a secondary fulcrum point (in the second rotational degree of freedom) located at the base portion 12. This second rotational degree of freedom, shown in FIG. 4, may allow the arm rest portion 20 of the stabilizing shooting apparatus 10 to move to the left and right and achieve any desired position.

In an actual hunting situation or while the shooter is at a shooting range, the previous steps may be done in advance of the shot opportunity. In other words, the stabilizing shooting apparatus 10 may be previously situated, out of the base portion 12 holster, pre locked in a proper position, and rendered ready to be used well prior to a shot opportunity.

As shown in FIGS. 4-5, the wearer 24 may position the stabilizing shooting apparatus 10 under the same arm that controls the rear end of the firearm or crossbow 28 and which pulls the trigger of the firearm or crossbow 28. This creates a triangular configuration consisting of the base portion 12 which is attached to the waist of the wearer 24, the telescopic elongated member 14 which is anchored to the base portion 12, the arm of the wearer 24, and the torso of the wearer 24. The shooter may then align the firearm or crossbow 28, centering and holding his sight on the target. While the shooter's arm is supported by the arm rest portion 20, the arm remains steady and stationary. This may allow the firearm or crossbow 28 to also remain stationary and steady without wavering or drifting. It should be understood that the wearer 24 may use the stabilizing shooting apparatus 10 when shooting the firearm or crossbow 28 from a standing, sitting, or kneeling position. The operation of the stabilizing shooting apparatus 10 will be similar in any of these shooting positions.

Once the firearm or crossbow 28 has been discharged, the telescopic elongated member 14 may once again be retracted by turning the rotatable rings 40, 42 counterclockwise. The telescopic elongated member 14 may then be rotated such that it points downward and housed within the base portion 12. Once in this location, the protective flap 32 may again be applied to the base portion 12 to secure the stabilizing shooting apparatus 10 until which time the wearer 24 requires to use the stabilizing shooting rest 10 again.

Figure 6:
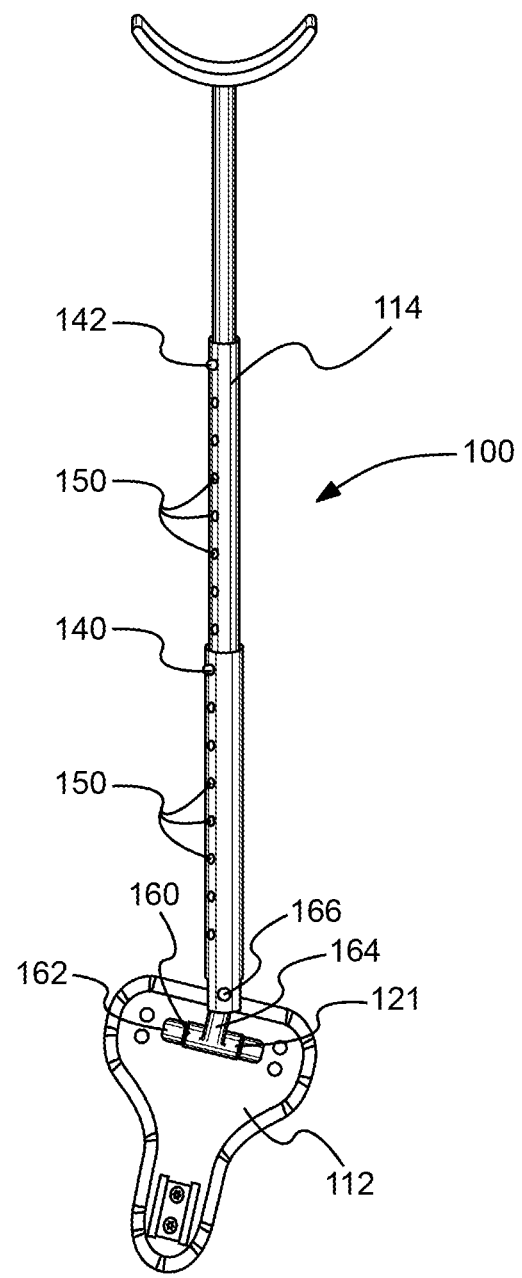
FIG. 6 depicts a perspective view of another stabilizing shooting apparatus extended according to one embodiment.
Figure 7:
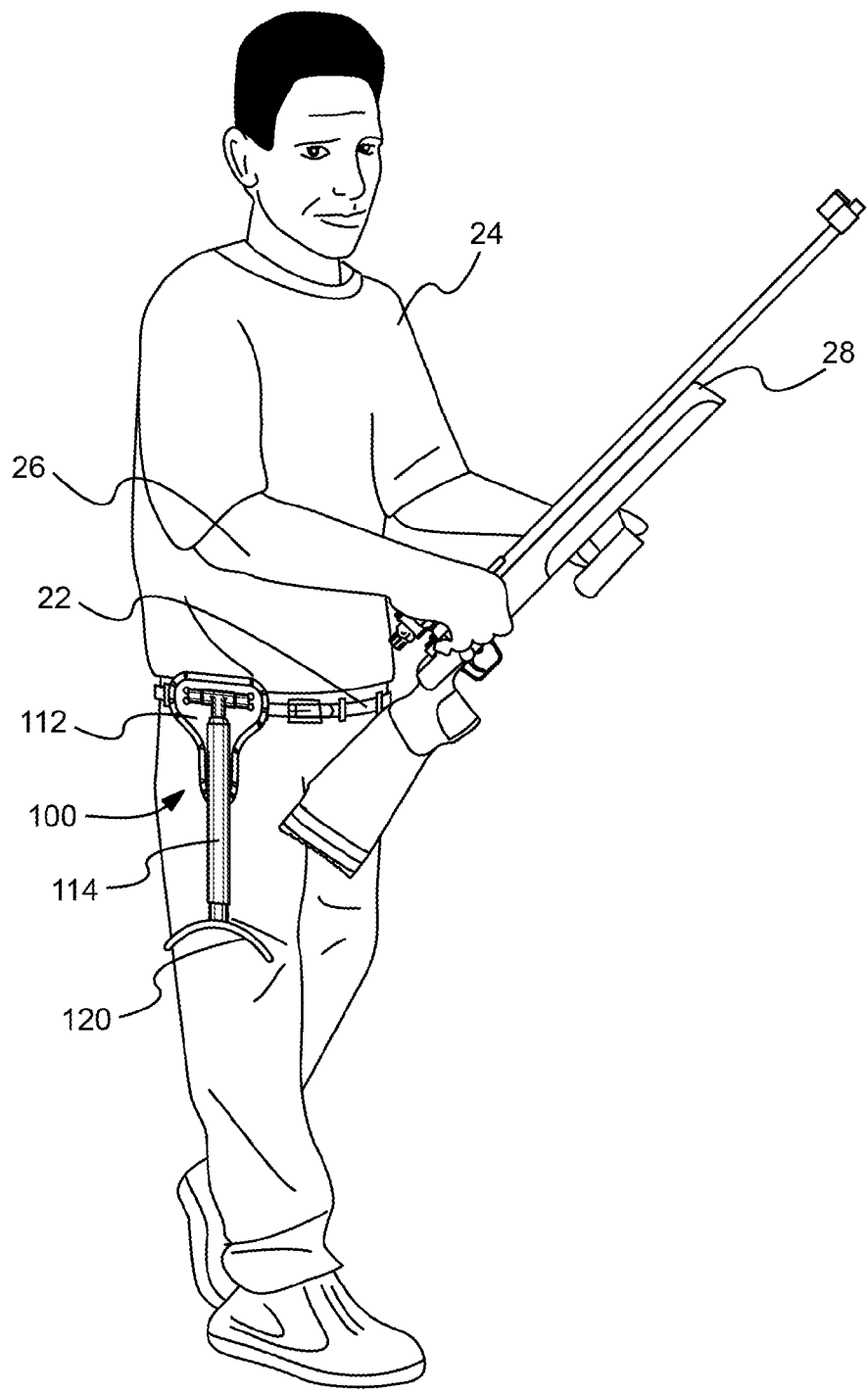
FIG. 7 depicts a perspective view of the stabilizing shooting apparatus of FIG. 6 being stored on the belt of the wearer refracted according to one embodiment.
Figure 8:
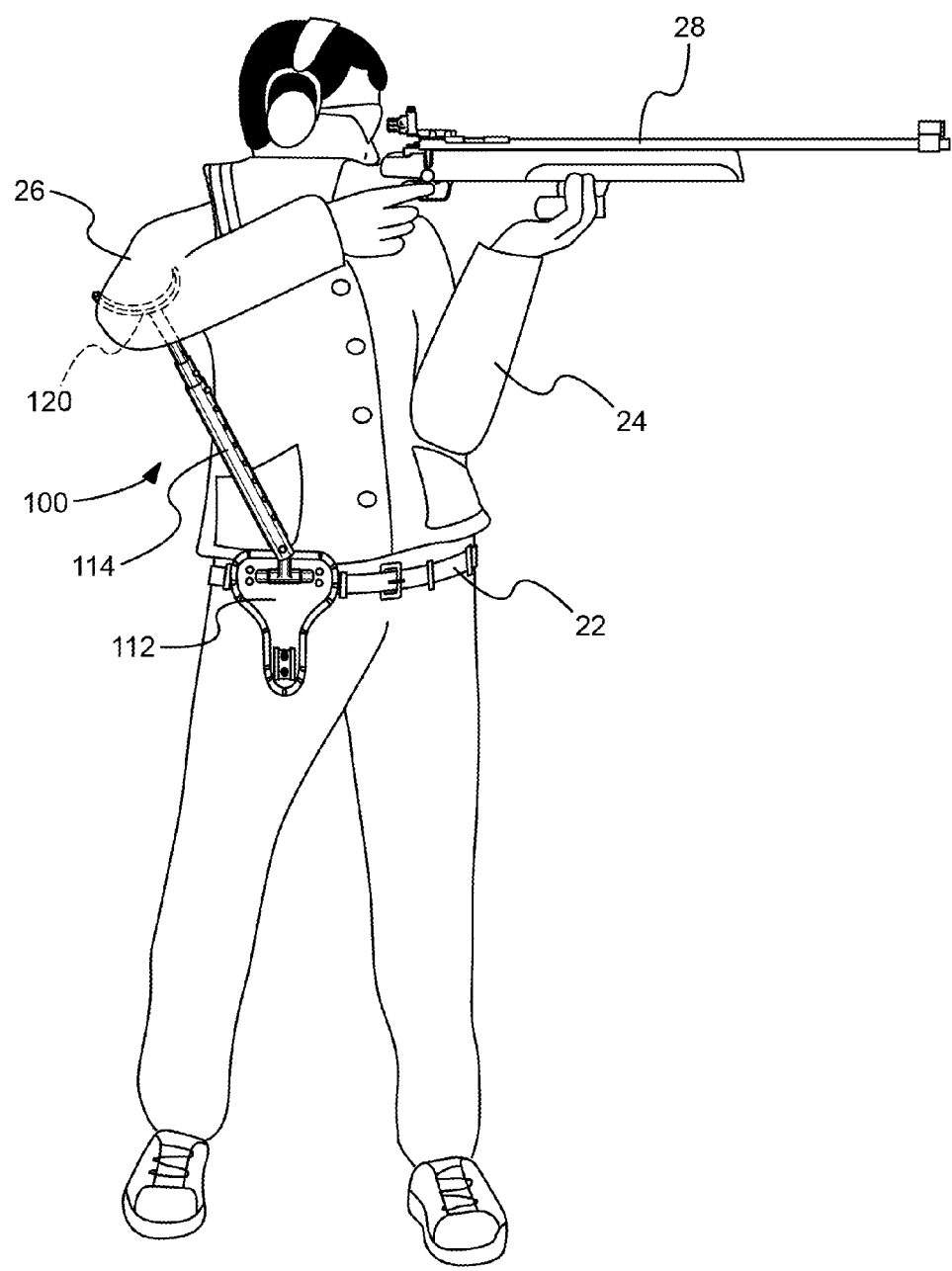
FIG. 8 depicts a perspective view of the stabilizing shooting apparatus of FIGS. 6-7 in use according to one embodiment.
Figure 9:
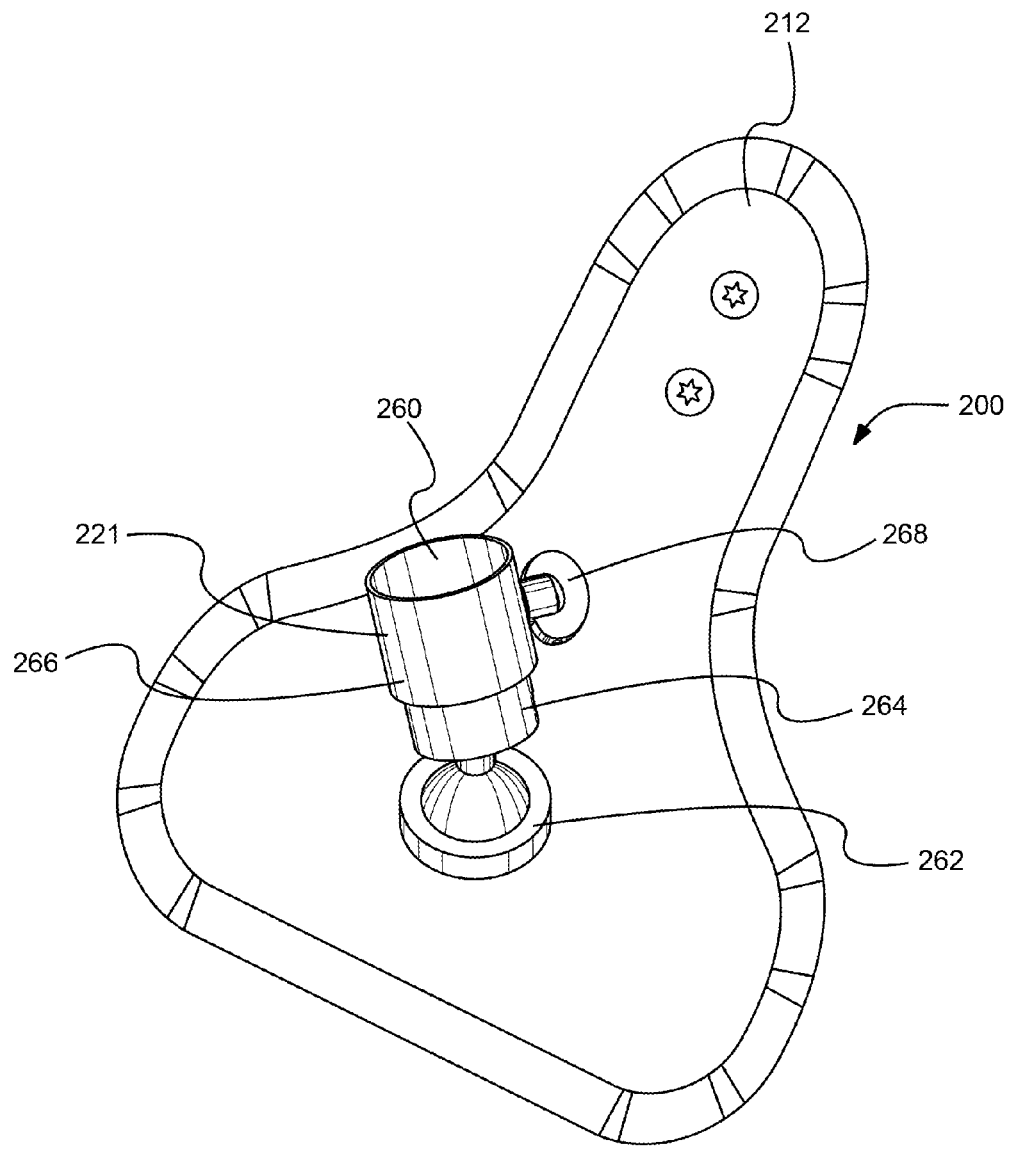
FIG. 9 depicts a perspective view of another stabilizing shooting apparatus base with a joint without an elongated member attached to the joint according to one embodiment.
Figure 10:
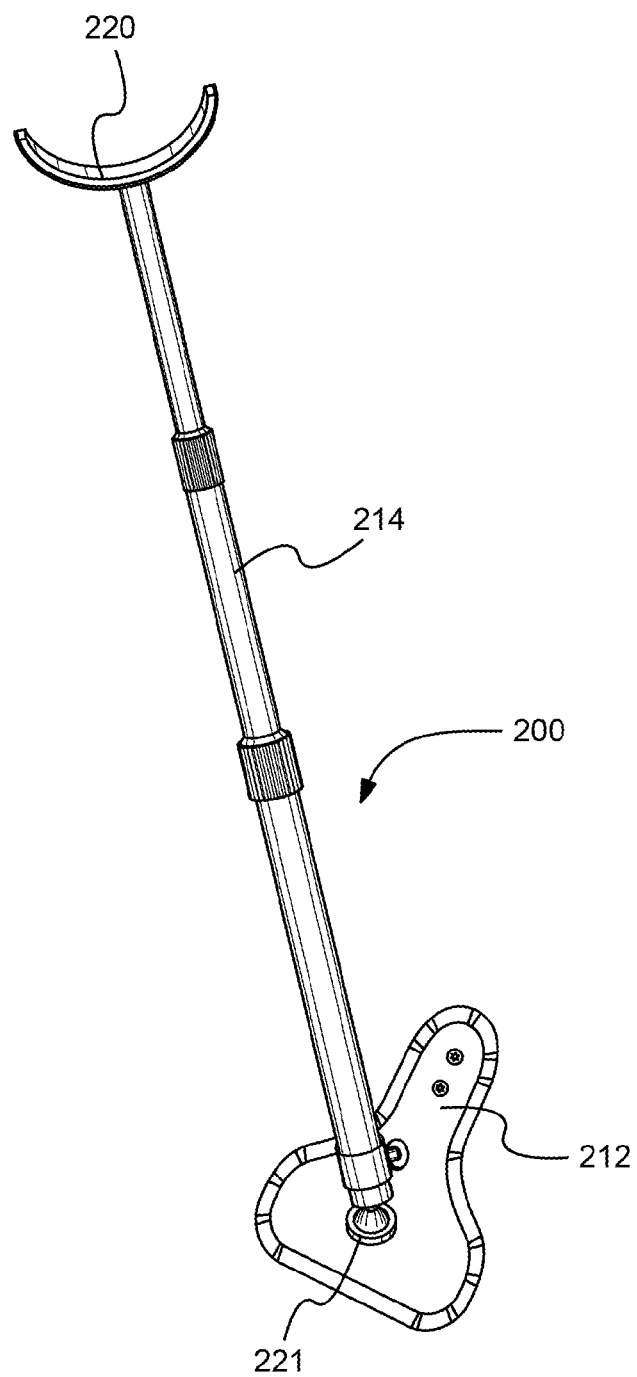
FIG. 10 depicts a perspective view of the stabilizing shooting apparatus of FIG. 9 with the elongated member attached to the joint according to one embodiment.

Referring now to FIGS. 6-8, another stabilizing shooting apparatus 100 is shown. The stabilizing shooting apparatus 100 includes a base portion 112 attachable to a belt of a wearer/shooter, similar to the stabilizing shooting apparatus 10. The stabilizing shooting apparatus 100 also includes a telescopic elongated member 114 attached to the base portion 112 and an arm rest portion 120 attached to the telescopic elongated member 114. The telescopic elongated member 114 is similar to the telescopic elongated member 14 except rather than rotatable rings 40, 42, the telescopic elongated member 114 features spring loaded button locks 140, 142 that include a spring loaded button and a series of holes 150 representing accommodations for increasing or decreasing the length of the telescopic elongated member 114, thus resulting in numerous options for arm rest positioning. Other than the spring loaded locking system, the stabilizing shooting apparatus 100 may be similar to the stabilizing shooting apparatus 10 described hereinabove. This embodiment displays that the disclosure is not limited to any particular locking system. Any system that provides for telescopic locking of the telescopic elongated member 114 is contemplated.

FIGS. 6-8 also show a different style joint 121. The joint 121 also includes two rotational degrees of freedom. The joint 121 allows for 180 degree rotation out of the page, and at least 180 degree rotation to the left and right about the base portion 112. This is achieved by a joint that includes an outer cylinder 160 that surrounds an inner cylinder 162. Extending form the outer cylinder 162 is a third cylinder 164 that attaches to the elongated element with a pin 166. The elongated member 114 can rotate about pin 166 with respect to the third cylinder 164. Furthermore, the outer cylinder 162 can rotate about the inner cylinder 160 to achieve the two rotational degrees of freedom. It should be understood that the third cylinder 164 may not be a cylinder at all, but include any other appropriate cross section. Furthermore, the rotational freedom may be partially prevented by the base portion 112 in this embodiment. However, the joint 121 may allow the arm rest portion 120 of the stabilizing shooting apparatus 100 to move to the left and right and achieve any desired position for any size hunter in any position when extending from the belt 22 of the wearer 24.

Further contemplated is another embodiment shown in FIGS. 9-13. This embodiment further shows a first stabilizing shooting rest 200 that includes a similar base portion 212 to the base portions 12, 112, and a telescopic elongated member 214 similar to the telescopic elongated members 14, 114. The stabilizing shooting rest 200 may include any or all of the attributes of the stabilizing shooting rest 10, 100 described hereinabove. However, the first stabilizing shooting rest further includes a joint 221 that is different from the joint 121 and the joint 21. The joint 221 may provide for detachment of the telescopic elongated member 214. The telescopic elongated member 214 may include, for example, include threads that interact with internal threads (not shown) of the joint 221 in an opening 260 of the joint 221.

The joint 221 may further include a base element 262 that attaches to the base portion 212 of the first stabilizing shooting rest 200. The joint 221 may include a ball and socket that allows for two degrees of rotational freedom similar to the first joint 21. The ball and socket may be located under an inner cylinder 264 and an outer cylinder 266. The inner cylinder 264 may rotate about the ball and socket, and the outer cylinder 266 may rotate about the inner cylinder 264. This embodiment thus allows for the telescopic elongated element 14 to rotate about the base preventing the need to have the arm rest portion 220 from rotating about the telescopic elongated member 214. Like the previous joints 121, 21, the joint 221 may provide for at least two rotational degrees of freedom such that the joint 221 may allow the arm rest portion 220 of the stabilizing shooting apparatus 200 to move to the left and right and achieve any desired position. The joint 221 may also include a locking mechanism 268 that locks the inner cylinder 264, the outer cylinder 266 and the ball and socket joint to prevent rotation of the joint 221 and lock the telescopic elongated member 214 into place.

Figure 11:
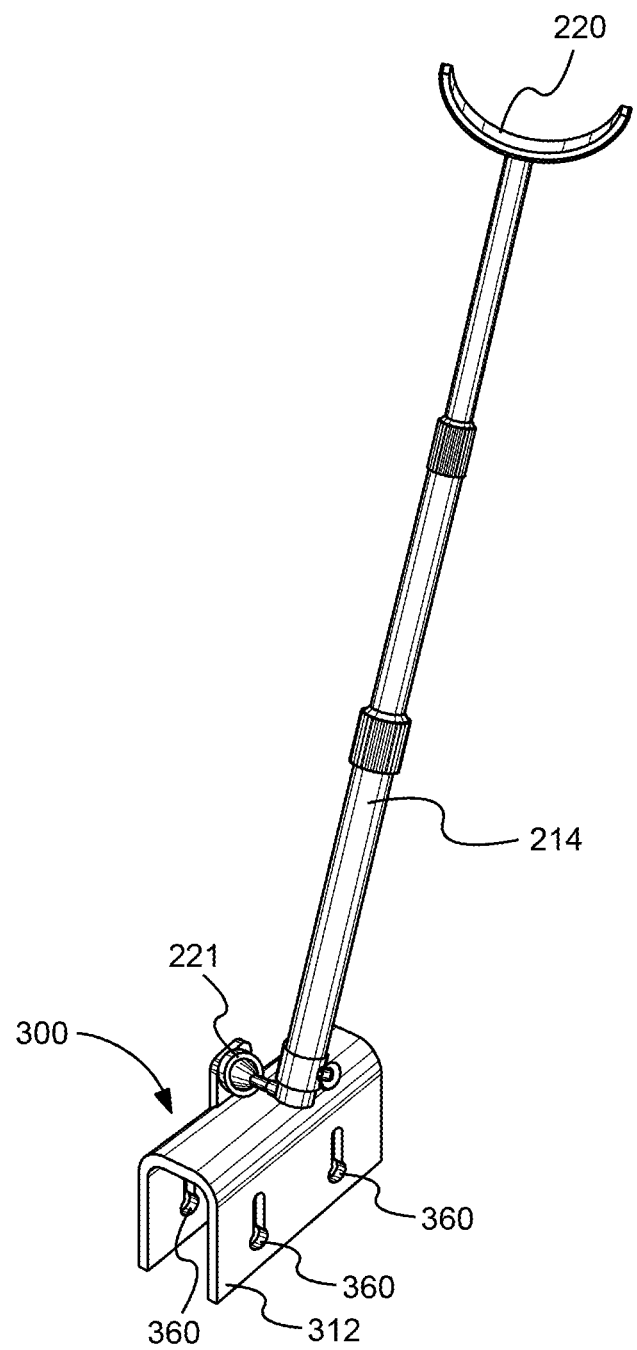
FIG. 11 depicts a perspective view of another stabilizing shooting apparatus according to one embodiment.
Figure 12:
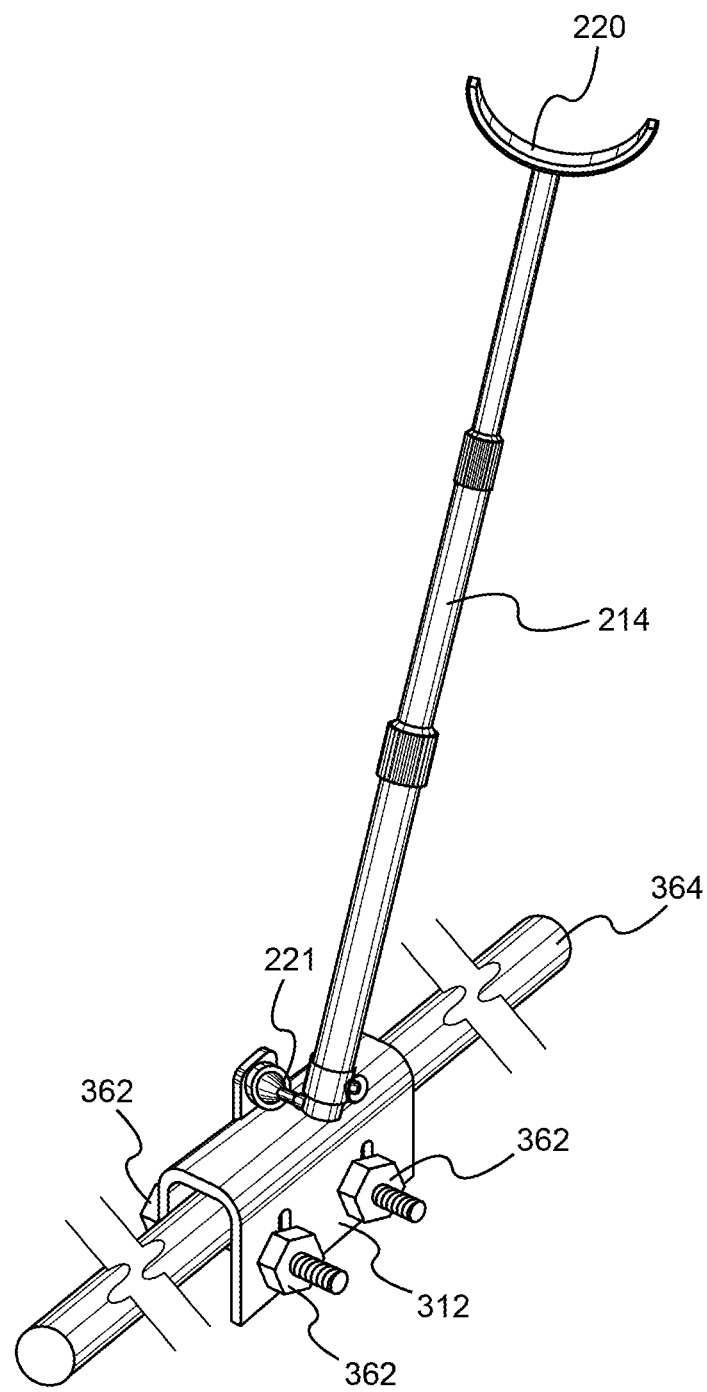
FIG. 12 depicts a perspective view of the stabilizing shooting apparatus of FIG. 11 attached to a rod according to one embodiment.
Figure 13:
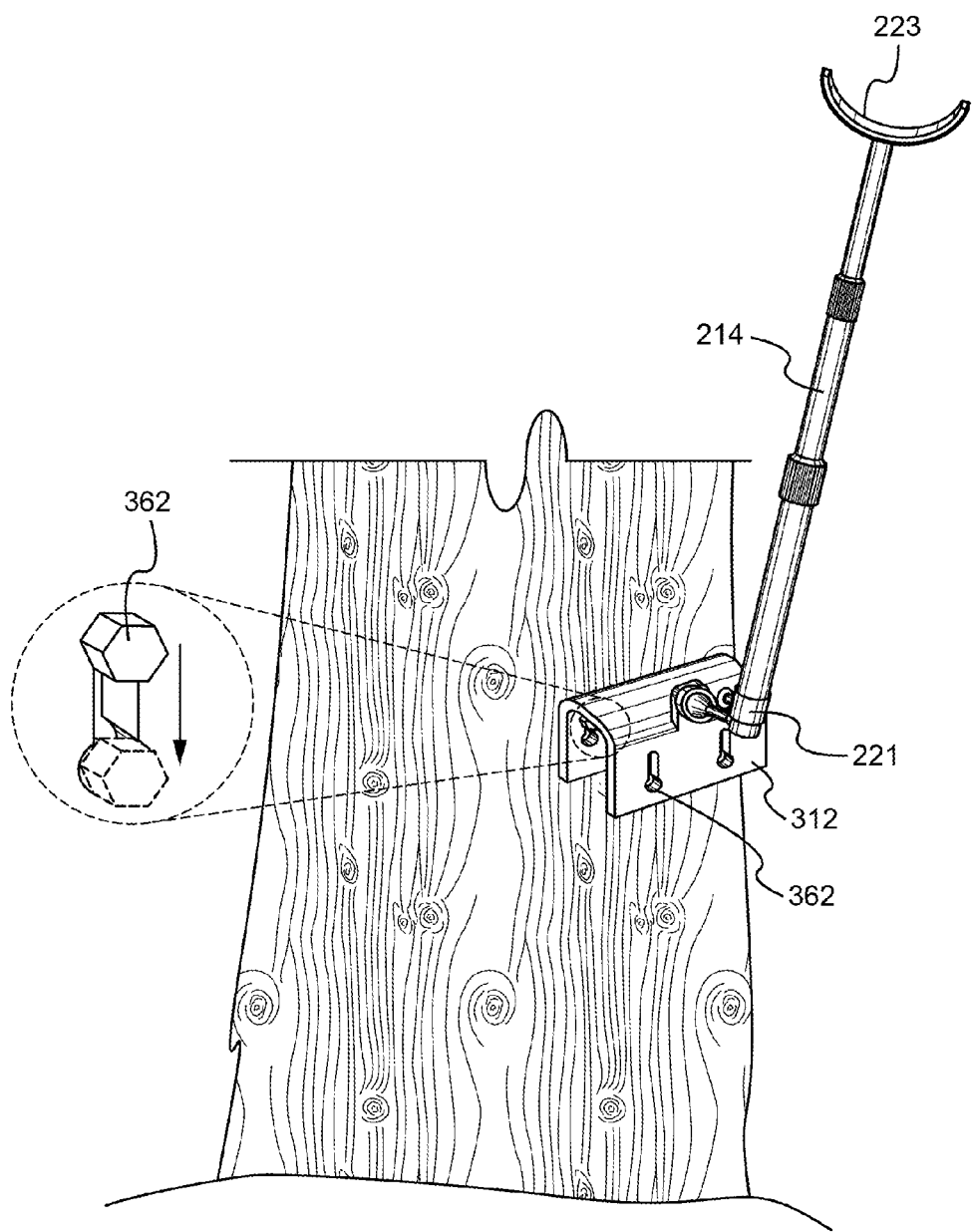
FIG. 13 depicts a perspective view of the stabilizing shooting apparatus of FIG. 12 attached to a tree according to one embodiment.
Figure 14:
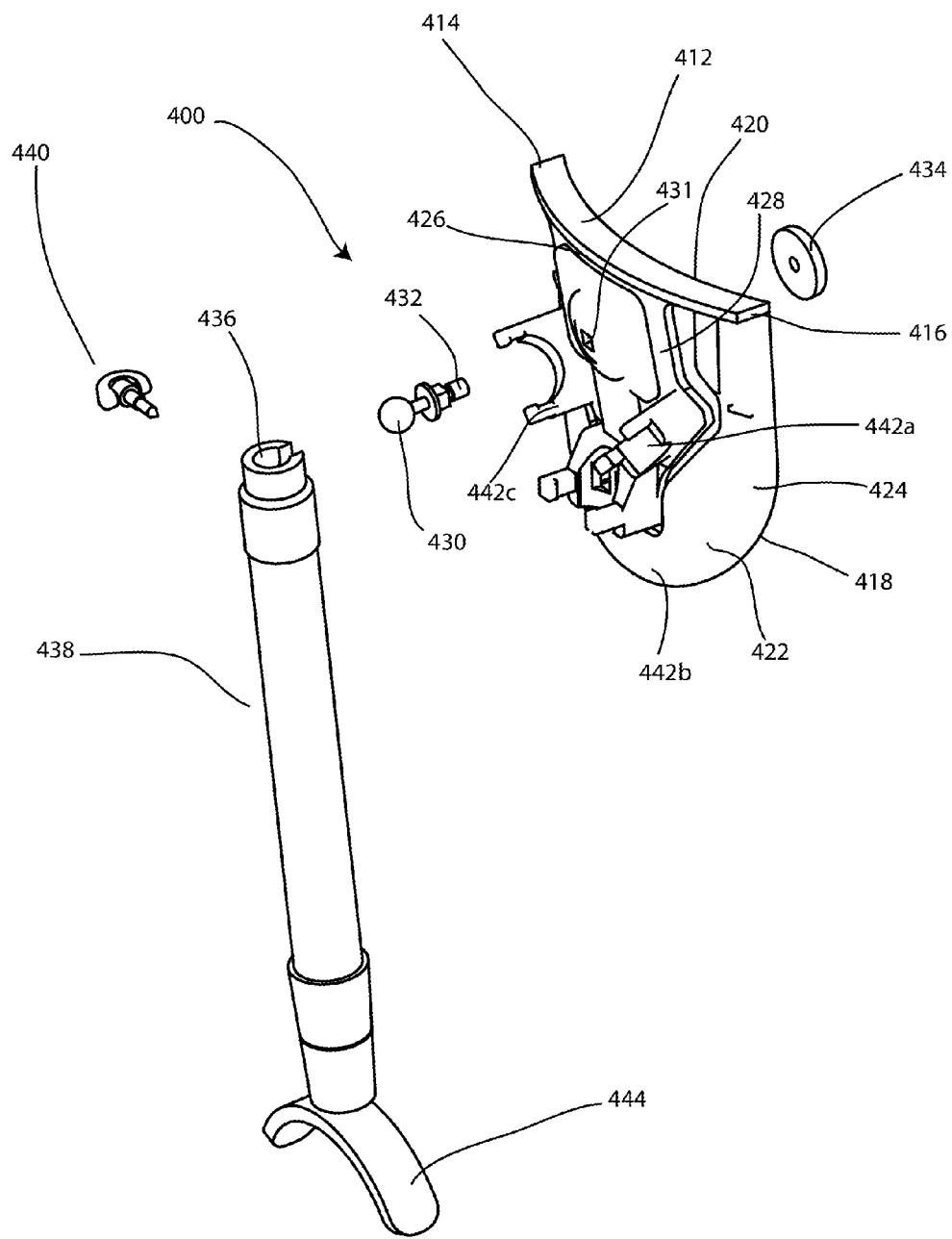
FIG. 14 depicts an exploded view of another stabilizing shooting apparatus according to one embodiment.
Figure 15:
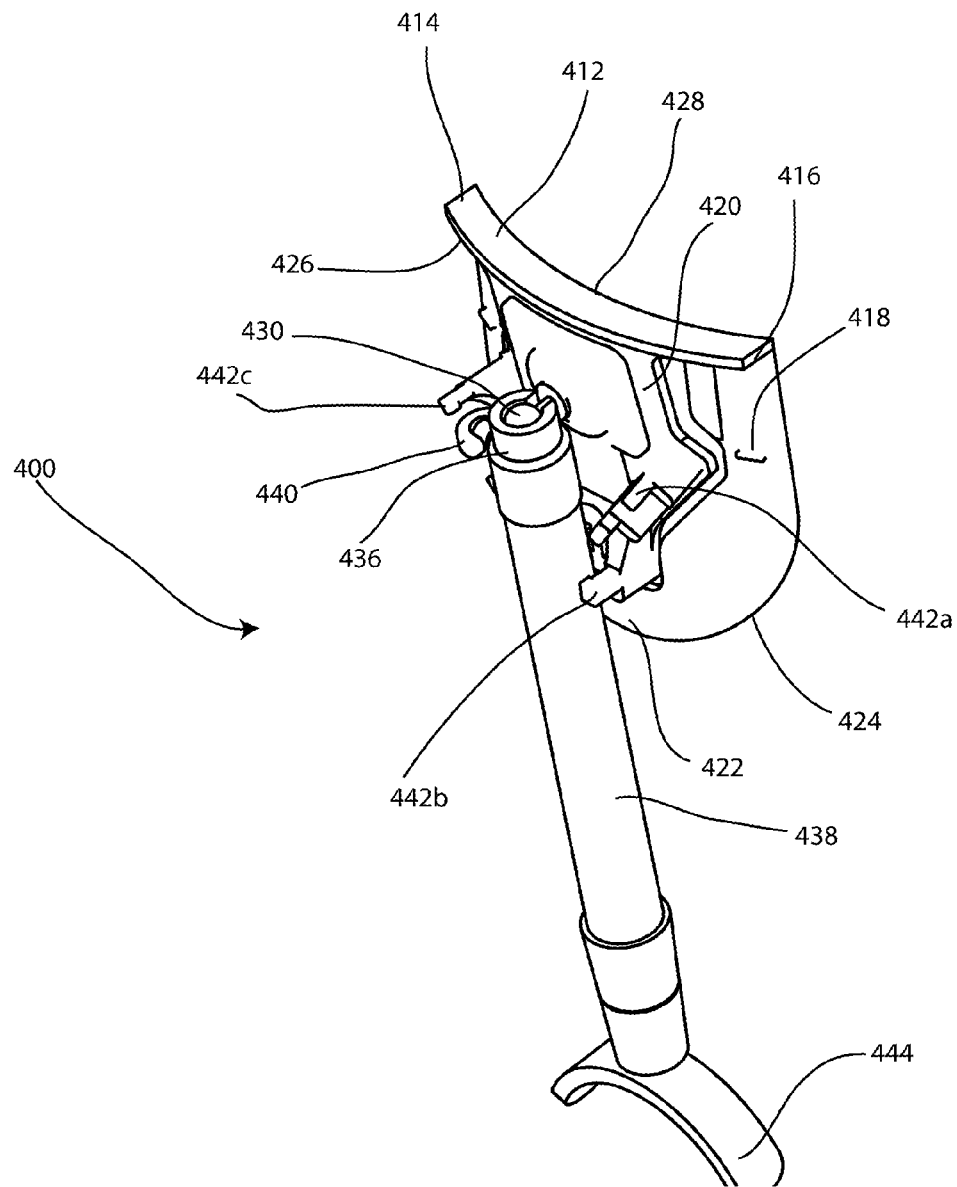
FIG. 15 depicts a perspective view of the stabilizing shooting apparatus of FIG. 14 according to one embodiment.

The attachable and detachable joint 221 may allow the elongated element to be removed and attached to a second stabilizing shooting rest 300, shown in FIGS. 11-13. This stabilizing shooting rest 300 includes a base portion 312 that includes a U shaped cross section. At the top of the U-shaped cross section on the base portion 312 may include a second of the joints 221. The joint 221 may receive the elongated member 214 in a similar manner to the attachment to the first base portion 212 of the first stabilizing shooting apparatus 200. This base portion 312 further includes openings 360 in which bolts 362 may be inserted in order to tighten the base portion 312 to a rod, bar or beam 364. This may allow the base portion 312 to be attached directly to the bar 364 of a hunting chair, for example, as shown in FIG. 12. The openings may further be configured to receive two bolt heads in order to attach the base portion 312 to a tree or wood structure, as shown in FIG. 13. It should be understood that the attachment means for attaching the base portion 312 to a permanent wall or rod may be different than the embodiment shown. The shooter may thereby be able to use the base portion 212 when they are walking around, but may then permanently attach the base portion 312 to a permanent structure when the shooter reaches a more permanent location.

In one embodiment, a kit may be sold to a customer that includes the first stabilizing shooting apparatus 200, the second stabilizing shooting apparatus 300 (each including one of the joints 221), and one elongated member 214. This kit may further include a belt attachable to the first stabilizing shooting apparatus 200 in one embodiment. It should be understood that further kits may also be sold including the belt 22 and the stabilizing shooting apparatus 10, for example.

Further contemplated is a method of shooting a firearm or crossbow, such as the firearm or crossbow 28. The method includes providing a stabilizing shooting rest, such as the stabilizing shooting rest 10. The method further includes resting a rear arm or elbow on an arm rest portion of the stabilizing shooting rest; and holding a rear end of a firearm or crossbow with the rear arm. The method may further include shooting the firearm or crossbow, and then contracting the stabilizing shooting rest 10 and wearing the stabilizing shooting rest on a belt.

Referring now to FIGS. 14-19, another embodiment of a shooting rest 400 is shown. The shooting rest 400 may include a similar to the shooting rests 10, 100, 200 shown in FIGS. 1-10. Thus, the stabilizing shooting rest 400 may include any or all of the attributes of the stabilizing shooting rest 10, 100, 200 described hereinabove. However, unlike the shooting rests 10, 100, 200, the shooting rest 400 may include a base 410 that is attachable to the belt of a wearer without compression clips 30. Instead, the base may include a top member 412. The base 410 and the top member 412 may each extend from a first end 414 to a second end 416. The base 410 may also include a first portion 418 and a second portion 420. The first portion 418 may extend from each of the first end 414 and the second end 416 away from the top member 412. The first portion 418 may also extend to a middle point 422 located between the first and second ends 414, 416. The middle point 422 is a distal point of the base 410 relative to the top member 412. The outer edge 424 of the first portion 418 may extend in a semi circular shape or U-shape from the top member 412.

Figure 17:
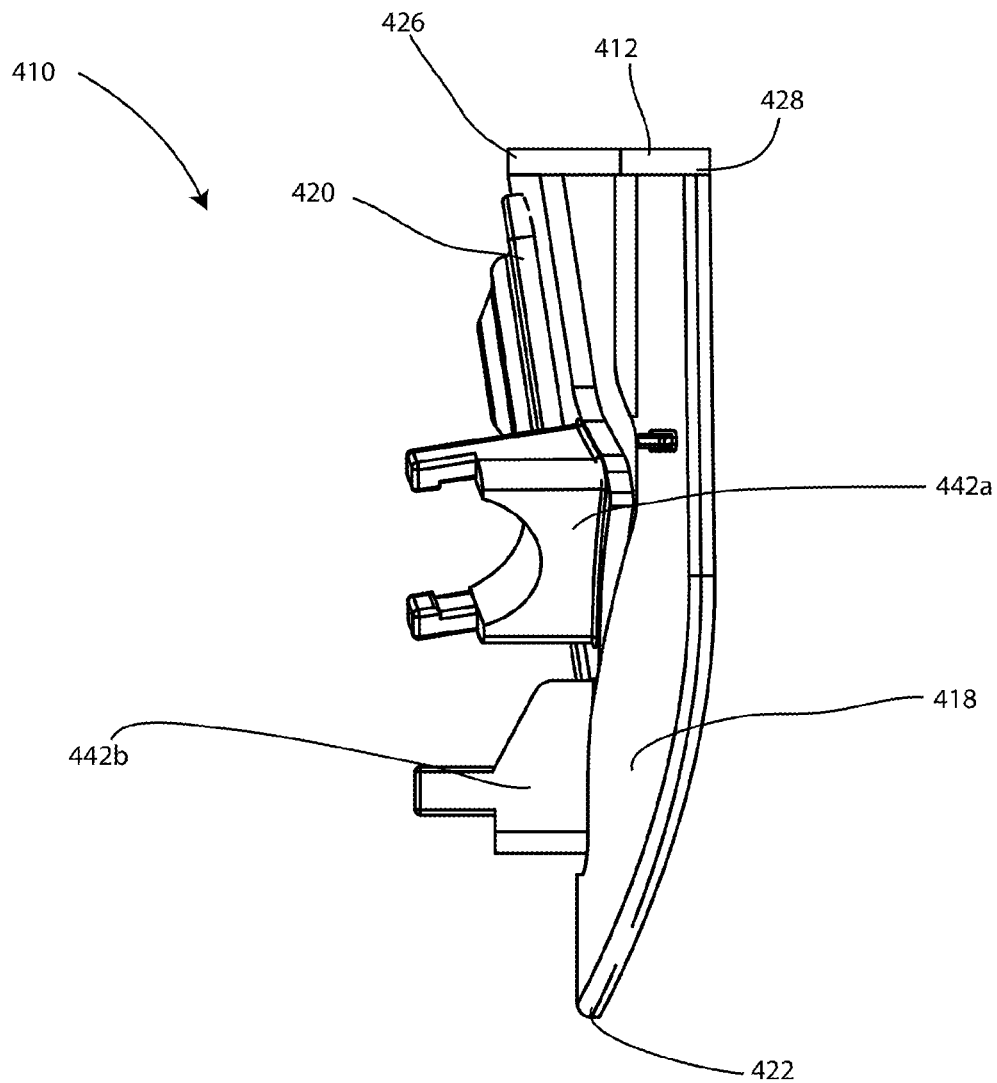
FIG. 17 depicts a side view of the base member of FIG. 16 according to one embodiment.

The base 140 may further include the second portion 420 that extends from the top member 412 within the bounds of the first portion 418 and the top member 412. The second portion 420 may be separately movable about the top member 412 relative to the first portion 418. As shown in FIG. 17, the top member 412 may extend between a top edge 426 and a bottom edge 428. The first portion 418 may extend from the bottom edge 428 of the top member 412. The second portion 420 may extend from the top edge 426 of the top member 412 at a downward angle toward the first portion 418. This structural configuration may allow the first portion 418 and the second portion 420 to be pulled apart such that the second portion 420 no longer extends at a downward angle. Once pulled apart, a belt may be inserted between the first and second portions 418, 420. Then, the first and second portions 418, 420 may be released, retaining the belt therein and securing the base 410 to the belt.

At a center location of the second portion 420 may be a ball shank 430. The second portion 420 may include an opening 431 for receiving a fastening component 432 of the ball shank 430. The fastening component 432 may, for example, be threaded, and may integrate with a bolt 434 or other fastening device which may secure the ball shank 430 to the second portion 420 of the base 410. The ball shank 432 may be configured to be received by a universal ball joint 436 of a telescopic elongated member 438. The telescopic elongated member 438 may be similar to the telescopic elongated members 14, 114, 214. In other words, the ball shank 432 and universal ball joint 436 may be configured to allow the telescopic elongated member 438 to move around the base 410 with at least two rotational degrees of freedom: pitching and yawing, in the embodiment shown. The telescopic elongated member 438 may be configured to lock into place by a thumb screw lock 440 which may be screwed into a threaded opening in the universal ball joint 436. The thumb screw lock 440 may be replaced by any appropriate locking mechanism.

The second portion 420 may further include a plurality of holding cradles 442a, 442b, 442c. The holding cradles 442a, 442b, 442c may be disposed on the second portion 420 at different locations. Each of the holding cradles 442a, 442b, 442c may be configured to receive and hold the telescopic elongated member 438. In the embodiment shown, the holding cradles 442a, 442b, 442c each include a semi circular channel that extends farther than 180 degrees in a circle. The telescopic elongated member 438 may have corresponding dimensions to the semi circular channel such that it locks within the channel by spreading out the tips of the channel when it is inserted therein. The tips then clasp the telescopic elongated member 438 within the channel after the telescopic elongated member is received.

The plurality of holding cradles 442a, 442b, 442c may be disposed such that the telescopic elongated member 438 is receivable and holdable at different rotational positions about the base 410. For example, in the embodiment shown, the holding cradle 442b may be configured to hold the telescopic elongated member 438 at a location that is directly beneath the opening 431 such that the telescopic elongated member 438 extends over the bottom middle point 422 of the first portion 418. The cradles 442a, 442c may be located equal to or approximately 45 degrees from the bottom cradle 442b about the opening 431 and the ball shank 430. These rotatably spaced cradles 442a, 442b, 442c may allow for the telescopic elongated member 438 to be facing downward toward the ground even if the wearer has rotated his or her body (for example, in a sitting position).

Figure 16:
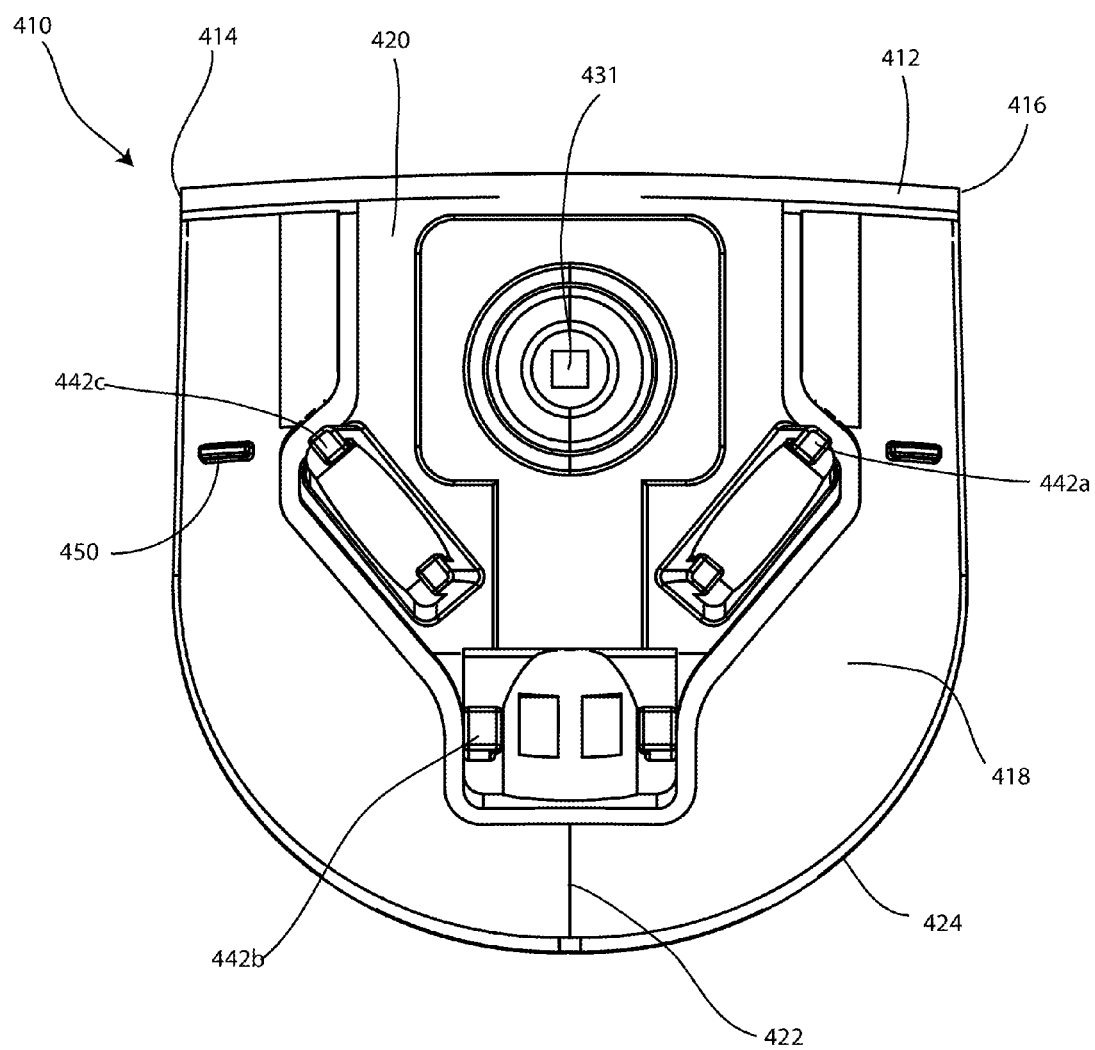
FIG. 16 depicts a front view of a base member of the stabilizing shooting apparatus of FIGS. 14-15 according to one embodiment.
Figure 18:
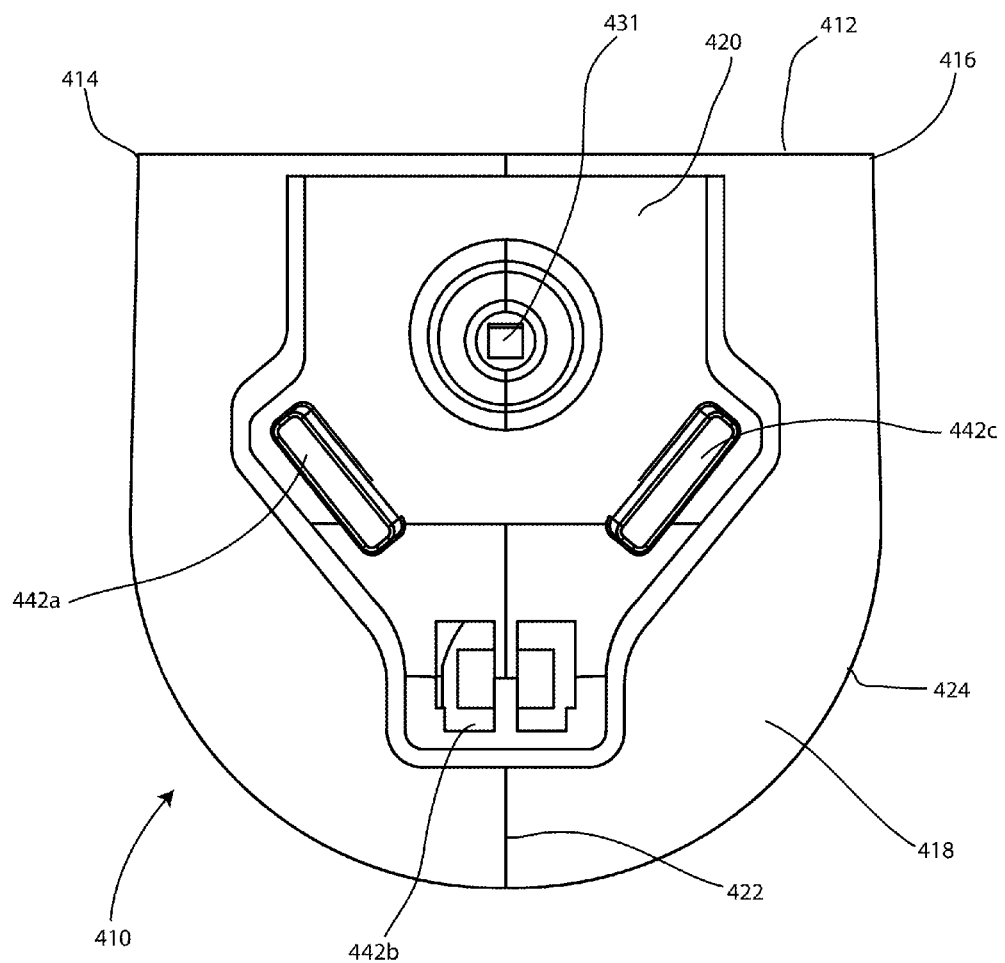
FIG. 18 depicts a back view of the base member of FIGS. 16-17 according to one embodiment.
Figure 19:
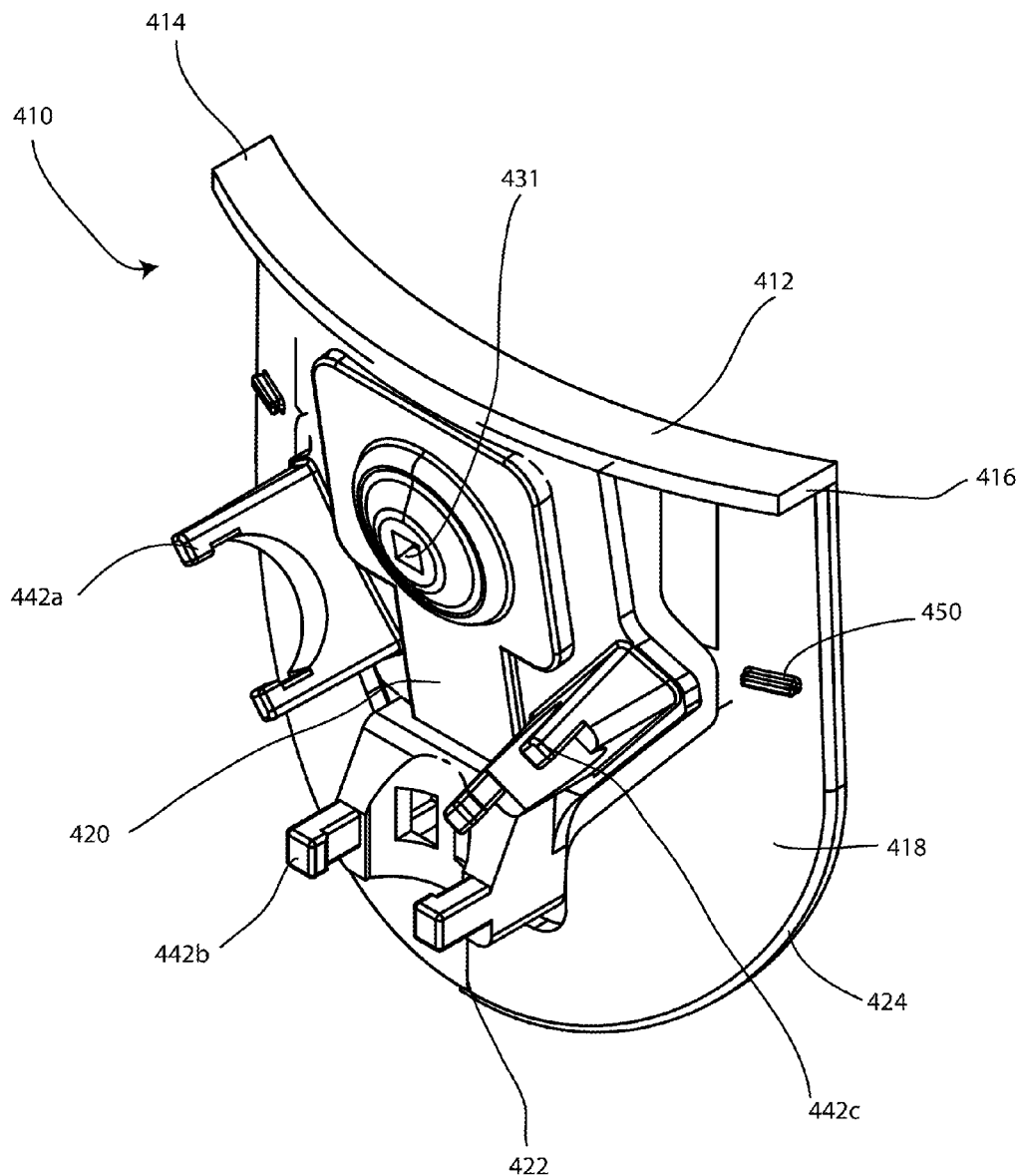
FIG. 19 depicts a perspective view of the base member of FIGS. 16-18 according to one embodiment.

In the embodiment shown, the outer dimension of the second portion 420 has similar dimensions than the inner dimension of the first portion 418. However, the second portion 420 has smaller dimensions to allow the second portion 420 to rest partially within the opening of the first portion 418. In other embodiments, the outer dimensions of the second portion 420 may be even smaller relative to the inner dimensions of the first portion 418. The inner dimensions of the first portion 418 and the outer dimensions of the second portion 420 may be curved in whatever shape is appropriate. In the embodiment shown, these dimensions extend downward from the top member 412, then extend outward to form two wings. The wings then converge at a flat horizontal nose. These dimensions are best shown in FIGS. 16 and 18. Moreover, the base 410 may include horizontal protrusions 450 on the front side (shown in FIG. 16) of the first portion 418 that are configured to retain the belt of a wearer and prevent the belt from sliding downward with respect to the base 410 of the shooting rest 400.

Similar to the telescopic elongated members 14, 114, 214, the telescopic elongated member 438 may include an arm rest 444 located at the distal end relative to the base 410. The arm rest 444 may be configured to rotate about the telescopic elongated member 438. Moreover, the arm rest 444 may be semi circular in shape. The arm rest 444 may include a pad for added comfort for the wearer. The telescopic elongated member 438 is shown in a contracted state. However, it should be understood that this member 438 is configured to expand similar to the telescopic elongated members 14, 114, 214 described hereinabove.

Further contemplated herein is a method of shooting a firearm or crossbow which includes providing a stabilizing shooting rest, such as the stabilizing shooting rest 10, 100, 200, 400. The method may include resting a rear arm or elbow on an arm rest portion of the stabilizing shooting rest and holding a rear end of a firearm or crossbow with the rear arm. The method may further include telescopically adjusting the telescopic elongated member and at least one of lengthening and shortening the telescopic elongated member. The method may further include rotating the telescopic elongated member with both pitching and yawing about the base portion. The method may further include rotating the arm rest portion of the telescopic elongated member about the telescopic elongated member.

Figure 20:
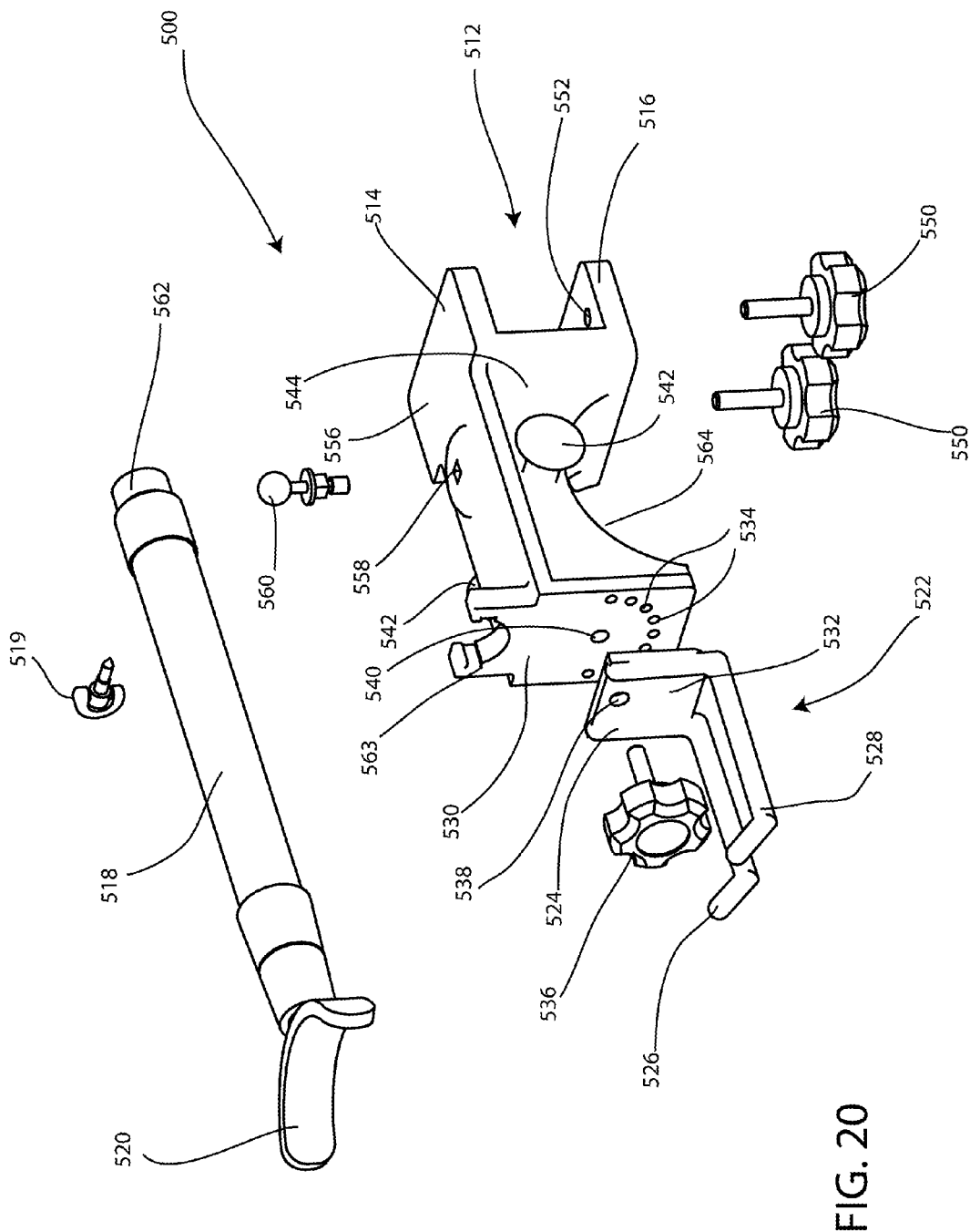
FIG. 20 depicts an exploded view of another stabilizing shooting apparatus according to one embodiment.
Figure 21:
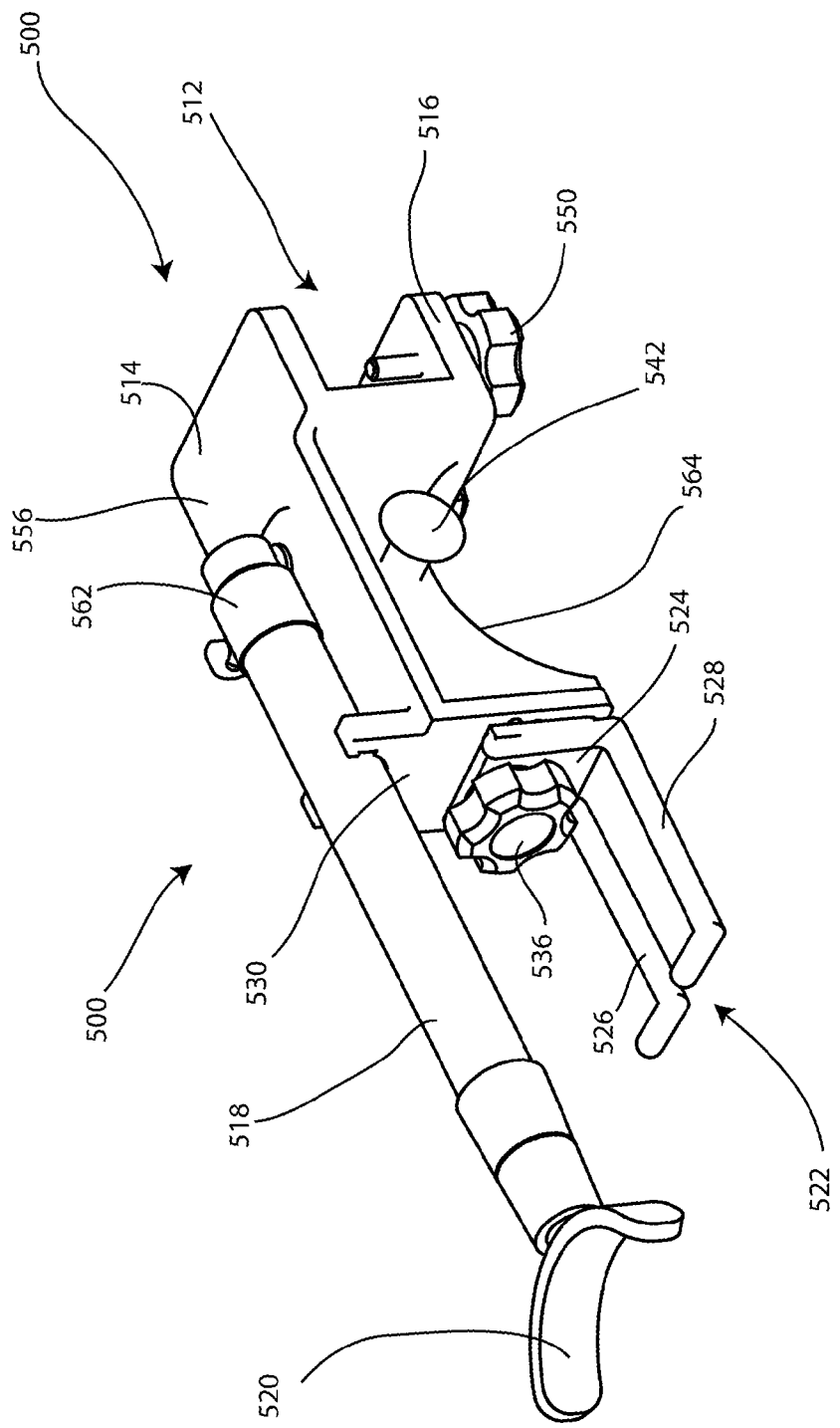
FIG. 21 depicts a perspective view of the stabilizing shooting apparatus of FIG. 20 according to one embodiment.

Referring now to FIGS. 20 and 21, another embodiment of a stabilizing shooting rest 500 is shown. The stabilizing shooting rest 500 may be similar to the stabilizing shooting rest 300 hereinabove in that the stabilizing shooting rest 500 may be attachable to a bar of a hunting chair, a tree, a wood structure, or any other permanent as shown in FIG. 13. It should be understood that the attachment means for attaching the base portion 312 to a permanent wall or rod may be different than the embodiment shown. The shooter may thereby be able to use the base portion 212 when they are walking around, but may then permanently attach the base portion 312 to a permanent structure when the shooter reaches a more permanent location.

The stabilizing shooting rest 500 includes a base 510. The base 510 may include a clamp 512 having an upper member 514 and a lower member 516. The stabilizing shooting rest 500 may include a telescopic elongated member 518 similar to the telescopic elongated members 14, 114, 214, 438 having a proximate end attached to the base 510 and extending to a distal end. The telescopic elongated member 518 attaches to the base 510 such that the telescopic elongated member 518 is movable about the base 510 with at least two rotational degrees of freedom. The telescopic elongated member 518 includes an arm rest 520 at the distal end. The arm rest 520 may have a semi circular shape and may be rotatable about the telescopic elongated member 518 similar to the embodiments described hereinabove. The arm rest 520 may be configured to stabilize a desired portion of a rear arm of the wearer while the wearer is shooting. The telescopic elongated member 518 may be locked into place by a thumb screw lock 519.

The clamp 512 may further include at least one thumb screw lock 550. In the embodiment shown, the clamp 512 includes two thumb screw locks 550. The thumb screw locks 550 may be threaded and may engage with threaded openings 552 found in at least one of the upper and lower members 514, 516 of the clamp 512. In the embodiment shown, the threaded openings 552 are formed in the lower member 516. It should be understood that the relative distance (compared to the other dimensions of the base 510) between the upper and lower members 514, 516 may be greater or less than the embodiment shown. In non relative terms, the distance may be between 1 and 4 inches. This may allow for the clamp 512 to clamp onto various different structural components. It should be understood that the clamping element may not include similar structure to the clamp 512 and may include other types of clamping mechanisms that are configured to clamp onto structural components in similar ways.

The stabilizing shooting rest 500 may further include a bow holder element 522. The bow holder element 522 may be attachable to the base 510. The bow holder element 522 may include a connecting plate 524, a first finger 526 and a second finger 528. The first and second fingers 526, 528 may be spaced apart such that a limb of a bow is insertable therein. For example, the first and second fingers 526, 528 may be spaced apart by between 0.5 and 4 inches, in some embodiments. The fingers 526, 528 may also have a length that allows for the entire bow limb to fit therein. For example, the fingers 526, 528 may have a length between 2 and 5 inches, in some embodiments. The fingers 526, 528 may also extend upward at the distal ends relative to the base 510 in order to prevent the bow limbs from falling out from between the fingers 526, 528. The fingers 526, 528 may extend substantially perpendicular from the plane of the connecting plate 524.

The connecting plate 524 of the bow holder element 522 may be configured to integrate with a flat surface 530 of the base 510 such that the connecting plate 524 may be configured to rotatably attach about the base 510 in a plurality of positions. A first surface (not shown) of the connecting plate 524 opposite a second surface 532 of the connecting plate 524 may include a protrusion (not shown). The flat surface 530 of the base 510 may include a plurality of first openings 534 which may be arranged in an arc. The protrusion may be configured to be inserted into each of the plurality of first openings 534 (one at a time) to retain the bow holder element 522 in each of the plurality of positions.

The connecting plate 524 may be attachable to the flat surface 530 of the base 510 with a thumb screw lock 536 that is insertable through both an opening 538 in the connecting plate 524 and a second opening 540 in the flat surface 530 of the base 510. The second opening 540 may be located within a center position of an arc of a plurality of first openings 534 located about the second opening 540. The protrusion in the first surface of the connecting plate 524 may be located directly below the opening 538 in the connecting plate 524 at the same distance that the first openings 534 are with respect to the second opening 540 in the flat surface 540. Thus, the connecting plate 524 may first be aligned with the flat surface 530 of the base 510 so that the protrusion is inserted into one of the first openings 534 of the flat surface 540 of the base 510. Then, the screw lock 536 may be insertable into both openings 538, 540 and tightened to lock the bow holder element 522 into the base 510.

In another embodiment (not shown), the connecting plate 524 may be biased against the base 510 with a spring loaded mechanism such that the protrusion is removable from the plurality of first openings 534 by pulling the connecting plate 524 from the flat surface 530. In this embodiment, for example, there may be a spring located between the connecting plate 524 and the flat surface 530. Pulling the connecting plate 524 from the flat surface 530 may decompress the spring from a previous mechanical equilibrium state, causing the spring to want to compress. This desire for the spring to want to compress after pulling the connecting plate 524 from the flat surface 530 will cause the connecting plate 524 to be pulled together with the flat surface 530 when the projection finds the proper first opening 534 and the user releases the connecting plate 524. It should be understood that a spring embodiment may prevent the need to fully remove the bow holder element 522 from the rest of the base 510.

In another embodiment, the base 510 of the shooting rest 500 may further include at least one accessory hanger 542. In the embodiment shown, the base 510 includes two accessory hangers 542 each on opposite sides of the base 510. The accessory hangers 542 may each protrude from a middle portion 544 of the base 510. The middle portion 544 may be located between the two ends of the base 510 defined by the first surface 530 and the clamp 512. The accessory hangers 542 may have circular cross sections, and may have a larger circumferential knobbed end in order to retain any hanged accessories to prevent the hanged accessories from falling from the shooting rest 500.

On a top surface 556 of the base 510 may be an opening 558 into which a ball shank 560 may be attachable. The ball shank 560 may be similar to the ball shank 430 described hereinabove. The ball shank 560 may be configured to receive a universal ball joint 562 of the telescopic elongated member 518. Like the above embodiments, the telescopic elongated member 518 may be configured to rotate about the base 510 in at least two rotational degrees of freedom: for example by pitching and yawing about the base 510. The top surface 556 may also include a cradle 563 located at the end of the first surface 530. A portion of the cradle 563 may actually comprise a portion of the first surface 530. The cradle 563 may be configured to receive the telescopic elongated member 518 in a similar manner to that described hereinabove with respect to how the cradles 442a, 442b, 442c receive the telescopic elongated member 438.

A bottom surface 564 may be located on the base 510 below the top surface 556 and may be curved in a semi annular shape in order to provide structural integrity to the base 510. However, it should be understood that the curved bottom may not be necessary. Instead, the base may have another shaped bottom, or may simply be flat.

In another embodiment, a method of stabilizing a firearm or crossbow may include providing a stabilizing shooting rest, such as the stabilizing shooting rest 500. The method may include attaching the stabilizing shooting rest to an object, and resting a rear arm or elbow on the arm rest portion of the stabilizing shooting rest. The method may include holding a rear end of the firearm or crossbow with the rear arm. The method may further include telescopically adjusting the telescopic elongated member and at least one of lengthening or shortening the telescopic elongated member. The method may further include rotating the telescopic elongated member with both pitching and yawing about the base portion. The method may further include rotating the arm rest portion about the telescopic elongated member. Finally, the method may include attaching the connecting plate to the base, unattaching the connecting plate from the base, rotating the connecting plate about the base and reattaching the rotated connecting plate to the base.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A stabilizing shooting rest comprising:
a base attachable to a belt of a wearer;
a telescopic elongated member having a proximate end attached to the base and extending to a distal end, the telescopic elongated member attaching to the base such that the telescopic elongated member is movable about the base with at least two rotational degrees of freedom; and
an arm rest at the distal end of the telescopic elongated member, the arm rest configured to stabilize a desired portion of a rear arm of the wearer while the wearer is shooting;
wherein the base includes a plurality of holding cradles disposed at different locations, each of the plurality of holding cradles configured to receive and hold the telescopic elongated member, the plurality of holding cradles disposed such that the telescopic elongated member is receivable and holdable at different rotational positions about the base.

2. The stabilizing shooting rest of claim 1, wherein the base includes a top member, wherein the base and the top member each extend from a first end to a second end, wherein a first portion of the base extends from each of the first end and the second end away from the top member, the first portion extending to a middle point located between the first and second end, wherein the middle point is a distal point of the base relative to the top member.

3. The stabilizing shooting rest of claim 2, wherein the base includes a second portion extending from the top member, the second portion extending within the bounds of the first portion and the top member, the second portion separately moveable about the top member relative to the first portion, wherein the second portion includes the plurality of holding cradles.

4. The stabilizing shooting rest of claim 3, wherein the top member extends between a top edge and a bottom edge, wherein the first portion extends from the bottom edge of the top member, and wherein the second portion extends from a top edge of the top member, and wherein the second portion extends from the top edge of the top member at a downward angle toward the first portion.

5. The stabilizing shooting rest of claim 3, wherein the second portion includes a ball shank that is configured to attach to a universal ball joint of the telescopic elongated member.

6. The stabilizing shooting rest of claim 1, wherein the telescopic elongated member is attached to the base with a ball shank and a universal ball joint.

7. The stabilizing shooting rest of claim 6, wherein the telescopic elongated member is configured to be locked into place by a thumb screw lock.

8. The stabilizing shooting rest of claim 1, wherein the arm rest has a semi circular shape and is rotatable about the telescopic elongated member.

9. A method of stabilizing a firearm or crossbow comprising:
providing a stabilizing shooting rest that includes:
base portion attachable to a belt of a wearer;
telescopic elongated member having a proximate end attached to the base portion and extending to a distal end, the telescopic elongated member attaching to the base portion such that the telescopic elongated member is movable about the base portion with at least two rotational degrees of freedom; and
an arm rest portion at the distal end of the telescopic elongated member, the arm rest portion configured to stabilize desired portion of a rear arm of the wearer while the wearer is shooting;
wherein the base includes a plurality of holding cradles disposed at different locations, each of the plurality of holding cradles configured to receive and hold the telescopic elongated member, the plurality of holding cradles disposed such that the telescopic elongated member is receivable and holdable at different rotational positions about the base
resting a rear arm or elbow on the arm rest portion of the stabilizing shooting rest; and
holding a rear end of a firearm or crossbow with the rear arm.

10. The method of claim 9, further comprising telescopically adjusting the telescopic elongated member and at least one of lengthening and shortening the telescopic elongated member.

11. The method of claim 9, further comprising rotating the telescopic elongated member with both pitching and yawing about the base portion.

12. The method of claim 9, further comprising rotating the arm rest portion about the telescopic elongated member.

13. A stabilizing shooting rest comprising:
a base attachable to a belt of a wearer, wherein the base includes a top member, wherein the base and the top member each extend from a first end to a second end, wherein a first portion of the base extends from each of the first end and the second end away from the top member, the first portion extending to a middle point located between the first and second end, wherein the middle point is a distal point of the base relative to the top member, wherein the base includes a second portion extending from the top member, the second portion extending within the bounds of the first portion and the top member, the second portion separately moveable about the top member relative to the first portion;

a telescopic elongated member having a proximate end attached to the base and extending to a distal end; and an arm rest at the distal end of the telescopic elongated member, the arm rest configured to stabilize a desired portion of an arm of the wearer while the wearer is shooting;

wherein the second portion includes a plurality of holding cradles disposed on the second portion at different locations each of the plurality of holding cradles configured to receive and hold the telescopic elongated member, the plurality of holding cradles disposed such that the telescopic elongated member is receivable and holdable at different rotational positions about the base.

14. The stabilizing shooting rest of claim 13, wherein the arm is the rear arm.

15. The stabilizing shooting rest of claim 13, wherein the telescopic elongated member attaches to the base such that the telescopic elongated member is movable about the base with at least two rotational degrees of freedom by pitching and yawing.

16. The stabilizing shooting rest of claim 13, wherein the top member extends between a top edge and a bottom edge, wherein the first portion extends from the bottom edge of the top member, and wherein the second portion extends from a top edge of the top member, and wherein the second portion extends from the top edge of the top member at a downward angle toward the first portion.

17. The stabilizing shooting rest of claim 13, wherein the telescopic elongated member is attached to the base with a ball shank and a universal ball joint.

18. The stabilizing shooting rest of claim 17, wherein the telescopic elongated member is configured to be locked into place by a thumb screw lock.

* * * * *

UNITED STATES PATENT AND TRADEMARK OFFICE
CERTIFICATE OF CORRECTION

| | |
|---|---|
| PATENT NO. | : 8,826,581 B2 |
| APPLICATION NO. | : 13/974225 |
| DATED | : September 9, 2014 |
| INVENTOR(S) | : Edward E. Boll et al. |

Page 1 of 1

It is certified that error appears in the above-identified patent and that said Letters Patent is hereby corrected as shown below:

In the Claims

<u>COLUMN 15</u>
(Claim 13)
Lines 8-9 insert --,-- after "locations"

Signed and Sealed this
Fourth Day of August, 2015

Michelle K. Lee
*Director of the United States Patent and Trademark Office*